US012384679B2

United States Patent
Favetta et al.

(10) Patent No.: US 12,384,679 B2
(45) Date of Patent: Aug. 12, 2025

(54) PROCESS FOR PRODUCING A HIGHLY ACTIVATED, MONOLITHIC NET-SHAPED BIOCHAR ELECTRODE

(71) Applicant: Controlamatics Corporation, Cedar Knolls, NJ (US)

(72) Inventors: Dino Favetta, Cedar Knolls, NJ (US); Tao Chen, Jersey City, NJ (US); Eric P. Boon, Bloomfield, NJ (US)

(73) Assignee: Controlamatics Corporation, Cedar Knolls, NJ (US)

( * ) Notice: Subject to any disclaimer, the term of this patent is extended or adjusted under 35 U.S.C. 154(b) by 674 days.

(21) Appl. No.: 17/442,501

(22) PCT Filed: Mar. 30, 2020

(86) PCT No.: PCT/US2020/025708
§ 371 (c)(1),
(2) Date: Sep. 23, 2021

(87) PCT Pub. No.: WO2020/205731
PCT Pub. Date: Oct. 8, 2020

(65) Prior Publication Data
US 2022/0169511 A1 Jun. 2, 2022

Related U.S. Application Data

(60) Provisional application No. 62/826,005, filed on Mar. 29, 2019.

(51) Int. Cl.
*C01B 32/05* (2017.01)
*C25B 1/04* (2021.01)
(Continued)

(52) U.S. Cl.
CPC ............... *C01B 32/05* (2017.08); *C25B 1/04* (2013.01); *C25B 11/043* (2021.01);
(Continued)

(58) Field of Classification Search
CPC ......... C01B 32/05; C25B 11/043; C25B 1/04; H01M 8/1018; H01M 4/04; H01M 4/583
(Continued)

(56) References Cited

U.S. PATENT DOCUMENTS

| 4,273,839 A | 6/1981 | Carr et al. |
| 9,478,324 B1 | 10/2016 | Favetta et al. |

(Continued)

FOREIGN PATENT DOCUMENTS

| CN | 102136371 A | 7/2011 |
| CN | 108689407 A | 10/2018 |

(Continued)

OTHER PUBLICATIONS

Ursua, et al., Hydrogen Production from Water Electrolysis: Current Status and Future Trends, Proceedings of the IEEE, vol. 100, No. 2, Feb. 2012, pp. 410-426.

(Continued)

*Primary Examiner* — Niki Bakhtiari
*Assistant Examiner* — Omar M Kekia
(74) *Attorney, Agent, or Firm* — McCarter & English, LLP

(57) ABSTRACT

A method of fabricating a highly activated, highly porous, highly electrically conductive net-shaped monolithic electrode for use in an electrical energy storage device including an ultracapacitor, pseudo-capacitor, battery, or in an electricity producing device such as a fuel-cell or in a gas producing device, such as a hydrogen generator or an oxygen generator.

16 Claims, 10 Drawing Sheets

(51) Int. Cl.
  *C25B 11/043* (2021.01)
  *H01M 8/1018* (2016.01)
  *H01M 4/04* (2006.01)
  *H01M 4/583* (2010.01)

(52) U.S. Cl.
  CPC ............ *H01M 8/1018* (2013.01); *H01M 4/04* (2013.01); *H01M 4/583* (2013.01)

(58) Field of Classification Search
  USPC ....................................................... 429/231.8
  See application file for complete search history.

(56) References Cited

U.S. PATENT DOCUMENTS

| | | | |
|---|---|---|---|
| 10,121,563 | B2 | 11/2018 | Favetta et al. |
| 2006/0060824 | A1* | 3/2006 | Yasumura ............ H01M 8/0221 429/514 |
| 2012/0115063 | A1* | 5/2012 | Sumioka ............. H01M 8/0234 429/534 |
| 2013/0004408 | A1 | 1/2013 | Dua et al. |
| 2013/0105295 | A1 | 5/2013 | Eyer et al. |
| 2016/0068971 | A1 | 3/2016 | Phillips |
| 2016/0168726 | A1 | 6/2016 | Dryfe et al. |
| 2017/0040083 | A1 | 2/2017 | Favetta et al. |
| 2017/0179499 | A1* | 6/2017 | Ashley .................... H01M 8/08 |
| 2017/0190633 | A1 | 7/2017 | Cheiky et al. |
| 2017/0362719 | A1 | 12/2017 | Borole et al. |
| 2018/0277889 | A1* | 9/2018 | Anandan ........... H01M 10/0562 |
| 2018/0280927 | A1 | 10/2018 | Liu et al. |
| 2019/0067738 | A1 | 2/2019 | Ruther et al. |

FOREIGN PATENT DOCUMENTS

| | | | |
|---|---|---|---|
| CN | 109103031 | A | 12/2018 |
| CN | 109516458 | A | 3/2019 |
| EP | 2835362 | B1 | 2/2015 |
| EP | 3358656 | A1 | 8/2018 |
| JP | 2004084147 | A | 3/2004 |
| JP | 2017224562 | A | 12/2017 |
| JP | 2018178091 | A | 11/2018 |
| WO | 2013003615 | A2 | 1/2013 |
| WO | WO 2013/016367 | A1 | 1/2013 |
| WO | WO 2014/033756 | A2 | 3/2014 |
| WO | WO 2014/190235 | A1 | 11/2014 |
| WO | WO 2018/183564 | A1 | 10/2018 |
| WO | 2020205731 | A1 | 10/2020 |

OTHER PUBLICATIONS

Jiang, High Temperature Monolithic Biochar Supercapacitor Using Ionic Liquid Electrolyte, Journal of The Electrochemical Society, vol. 164, No. 8, 2017, pp. H5043-H5048.
Sajjadi et al., "A comprehensive review of physical activation of biochar for energy and environmental applications", Rev Chem Eng, 2018, p. 1-42.
PCT International Search Report and Written Opinion dated Jun. 16, 2020 for PCT Application No. PCT/US2020/025648.
PCT International Search Report and Written Opinion dated Sep. 20, 2020 for PCT/US2020/025708.
U.S. Appl. No. 62/826,038, filed Mar. 29, 2019.
PCT/US2020/025648, Mar. 30, 2020, WO 2020/205697.
Canadian Office Action from related Patent Application No. 3,135,358 issued Dec. 7, 2023.
Chinese Office Action from related Patent Application No. 202080039915.1 issued Dec. 26, 2023.
Eurasian First Office Action from related Patent Application No. 202192593.
Eurasian Second Office Action from related Patent Application No. 202192593.
Eurasian Third Office Action from related Patent Application No. 202192593.
European First Office Action from related Patent Application No. 20784263.4 issued Nov. 2, 2023.
European Search Report from related Patent Application No. 20784263.4 issued Mar. 16, 2023.
https://ru.wikipedia.org/wiki/; Google translation for "Activated Carbon" search, last viewed Apr. 24, 2024.
https://ru.wikipedia.org/wiki/; Google translation for "Solvation" search, last viewed Apr. 24, 2024.
Indian First Office Action from related Patent Application No. 202117045289 issued Feb. 20, 2023.
Indonesian First Office Action from related Patent Application No. P00202109278 issued May 29, 2023.
Japanese First Office Action from related Patent Application No. 2021-560337 issued Nov. 15, 2022.
Japanese Re-Examination Report from related Patent Application No. 2021-560337 issued Mar. 4, 2024.
Japanese Second Office Action from related Patent Application No. 2021-560337 issued Aug. 22, 2023.

\* cited by examiner

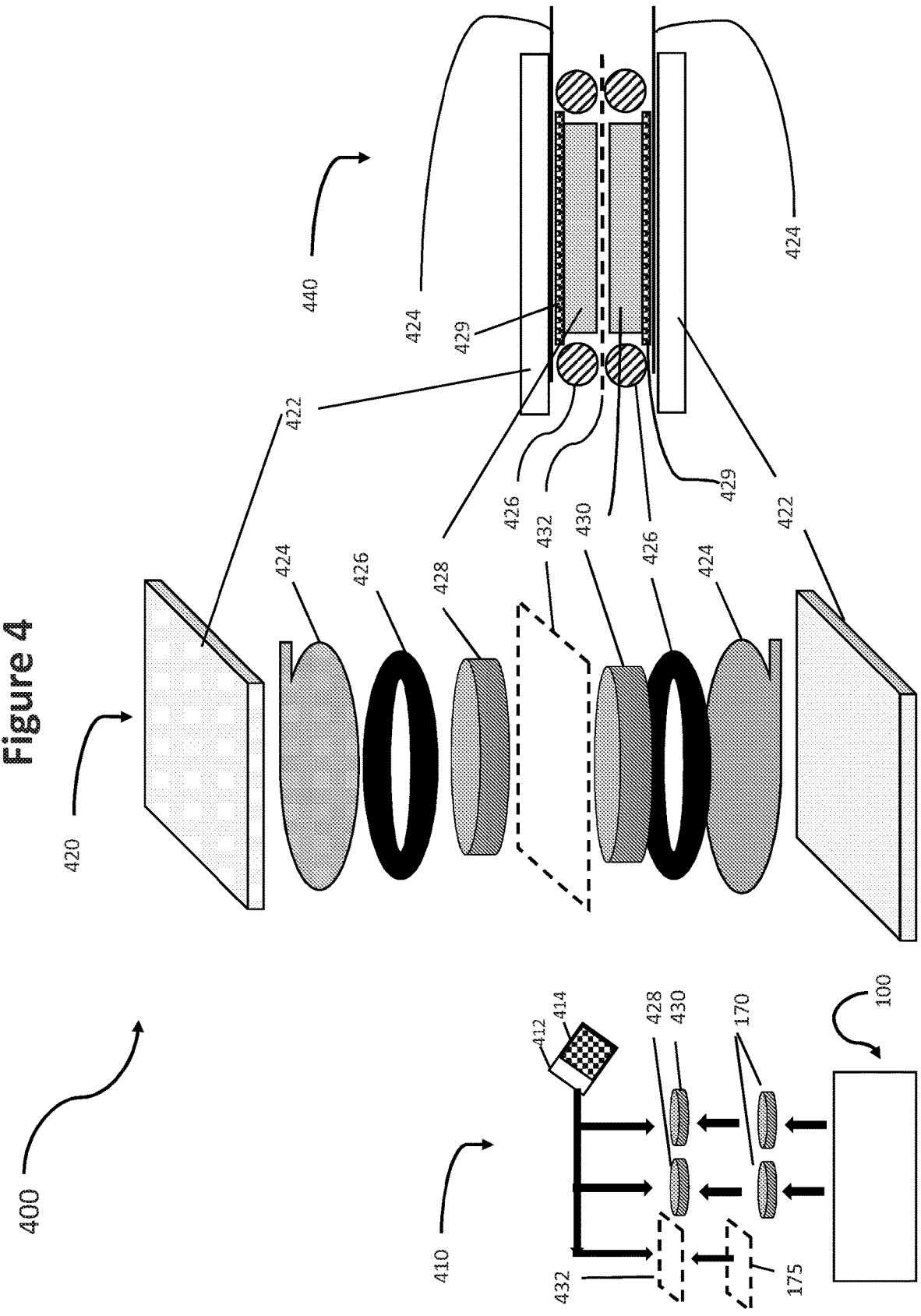

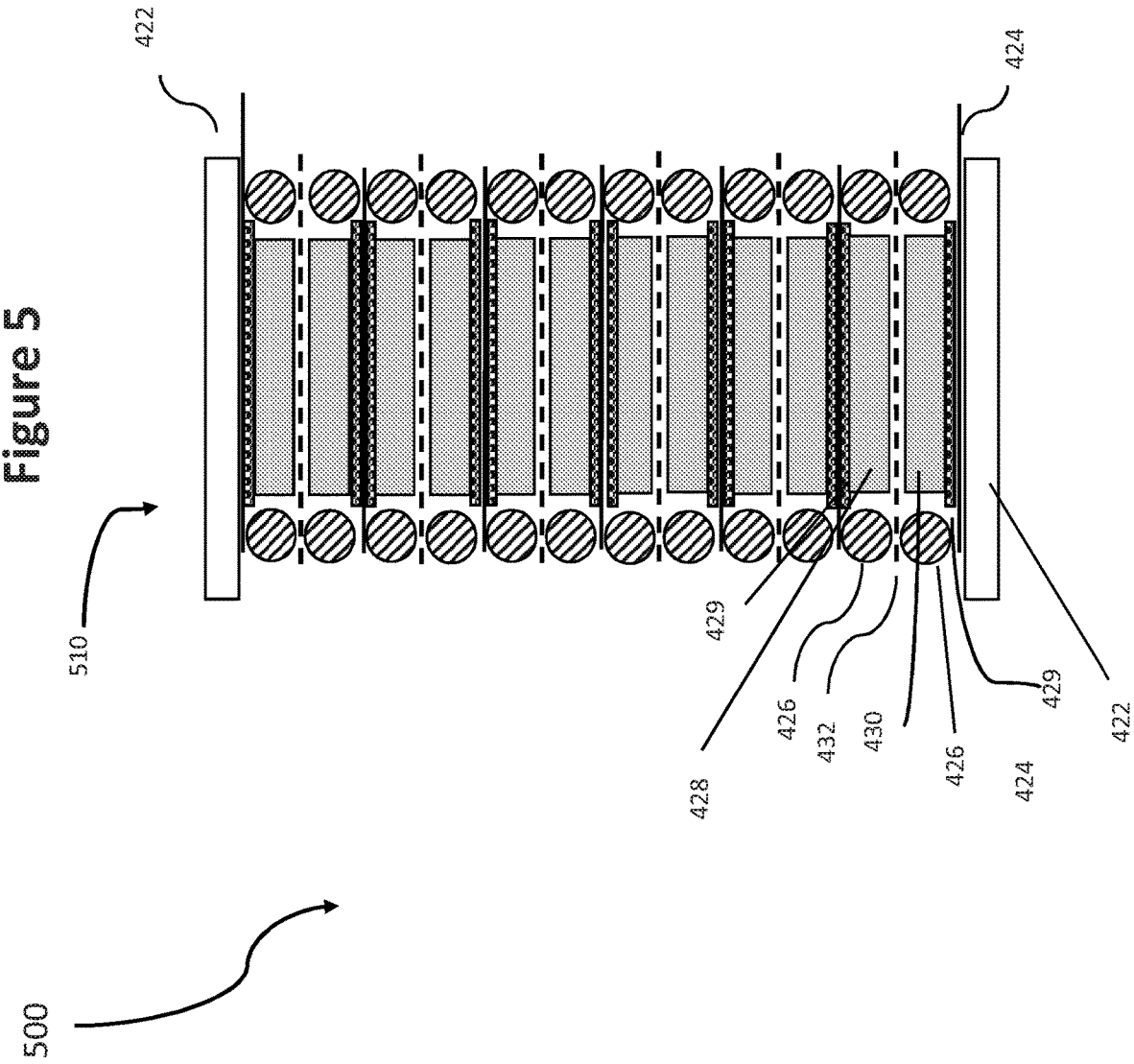

US 12,384,679 B2

PROCESS FOR PRODUCING A HIGHLY ACTIVATED, MONOLITHIC NET-SHAPED BIOCHAR ELECTRODE

CROSS-REFERENCE TO RELATED APPLICATION

The present application is a 35 U.S.C. § 371 National Stage filing of International Application No. PCT/US2020/025708, filed on Mar. 30, 2020, which application claims priority benefit to a provisional application entitled "Process for Producing a Highly Activated, Monolithic Net-Shaped Biomass Electrode for Use in an Ultracapacitor, Pseudo-Capacitor, Battery or Fuel-Cell," which was filed on Mar. 29, 2019, and assigned Ser. No. 62/826,005. The entire content of the foregoing applications is incorporated herein by reference.

BACKGROUND

Field of Invention

The present disclosure relates to methods for fabricating electrodes for electric storage devices, electricity producing devices, and hydrogen gas and oxygen gas production where such method includes formulating an advantageous compounded biomass blend, impregnating the biomass with pre-activating agents and/or progenitors, casting or molding the impregnated biomass blend to form pre-net-shaped monolithic biomass wafers or pellets (hereinafter simply referred to as "wafers"), and charring the wafers in a furnace to produce net-shaped electrically conductive monolithic carbonaceous biochar electrodes with hierarchical pores and channels. The present disclosure further relates to the use of the monolithic electrodes fabricated according to the disclosed method in ultra-capacitors, pseudo-capacitors, batteries and fuel-cells, and electrolysis-based gas generators. The processing and pre-net-shaping of the "un-charred" biomass into a precursor wafer utilizes no binders. The pre-net-shaped monolithic wafers are subsequently charred at high temperature wherein they shrink in size to produce the monolithic net-shaped high surface area activated biochar carbon electrodes containing hierarchical channels and pores. The fabrication of the biomass-sourced carbonaceous monolithic electrode uses no binders. These net-shaped biochar monolithic electrodes can be further shaped and activated prior to their final assembly into an ultracapacitor, pseudo-capacitor, battery or fuel-cell, or used as electrodes in an electrolysis-based gas generator to produce hydrogen and/or to produce oxygen.

Background Information

With the increase in global energy consumption and demand, there is a rise in the demand for renewable, sustainable, and clean energy source as well as a new, versatile, and scalable energy storage systems. For electrical storage in particular, batteries have been a focus due to the high energy density of their electric storage capabilities. However, ultracapacitor and pseudo-capacitors have been shown to be a promising electrochemical energy storage device due to their high power-density, low cost, excellent charge-discharge capability, long cycle life and environmental benefits. Fuel-cells do not store electricity, but rather provide an energy efficient method of converting chemically-stored energy as found in hydrogen and hydrocarbon fuel, directly into electricity upon and within an electrode. The use of a fuel cell to generate electricity is in contrast to the use of combustion fuel for steam generation for subsequent turbine power to generate electricity, as is typical of a traditional power plant.

Conventionally, the battery is widely used for many applications in our everyday life. However, there are many limitations to the battery that restricts its wide applicability as a sustainable energy storage device. For example, the extensive use of batteries in cellular devices or automobiles require immense amounts of lithium, nickel, manganese and cobalt, each of which needs to be harvested from the earth, thereby depleting these natural metal reserves. Being that these materials are not renewable after extraction, their sustainability is quite limited. As the demand for these non-renewable metals increases, so does their price. Some success has been achieved in recycling these specific lithium-battery related materials from spent batteries, but cost and re-purification presents many challenges.

As disclosed herein, contrary to their battery counterpart, ultracapacitors and pseudo-capacitors can be fabricated with electrodes made from renewable resources, such as biomass material (such as wood, such as grasses, such as other botanical plants), which makes them less costly and more environmentally friendly than common alkaline or lithium-ion batteries. Additionally, ultracapacitors have the capability to charge and discharge at a much faster rate and have longer life cycles with minimal degradation versus batteries due to the fact that the energy is stored electrostatically in ultracapacitors and pseudo-capacitors, rather than chemically as is done in battery technologies. The fast charge-discharge and greater number of life cycles allow ultracapacitors to work better, last longer and provide utility in other applications that demand such capabilities. The major drawback of common ultracapacitors is much lower energy density as compared to batteries, typically 20:1 or worse for ultracapacitors versus lithium-ion batteries.

Pseudo-capacitors can be simply described as a hybridization of ultracapacitors and batteries. As mentioned above, ultracapacitors store electric energy electrostatically while batteries store electric energy chemically. Pseudo-capacitors can use a similar electrode and ion transport mechanism as an ultracapacitor, but when the electric energy transported by the migrating charged ion reaches the electrode of opposite polarity, this ion bonds to the specific sites on the pseudo-capacitor electrode surfaces by weak chemical bond or redox reaction, somewhat mimicking the chemically-based charge storage mechanism of a battery. This gives the pseudo-capacitor much higher energy storage capability than the straightforward approach used in standard design ultracapacitors and causes the pseudo-capacitor's energy storage densities to increase above that of its ultracapacitor counterpart and approach that of batteries. A drawback is that this approach diminishes the pseudo-capacitor's power density (the rate at which it can discharge that electric energy) to be much less than that of the aforementioned high power density ultracapacitor performance. As a result, a pseudo-capacitor performs more like a battery. Furthermore, the chemical reaction mechanism used in pseudo-capacitors uses metals, such as manganese, iron or other metals and alloys, to facilitate this electric energy storage, thereby requiring non-renewable fabrication methods and causing diminished device life-cycles.

Fuel-cells convert a fuel feed material, most commonly hydrogen, to cause a chemical reaction within, on and in the electrode, to output electricity. The most common fuel-cell is the proto-exchange membrane (PEM) fuel-cell. This type of cell intakes hydrogen and oxygen (or air) to react internally on the membrane and conductive electrodes to form water and electricity. There are complications and difficulties in maintaining these PEM fuel-cells operational. The disclosed methods herein describe the production of a stable biochar-based monolithic carbon electrode that can be deployed in a PEM fuel-cell or other fuel-type feeds to fuel-cells.

Aside from electric energy storage discussed above, there is also a need for high grade hydrogen gas to be used as a clean fuel for engines and for the abovementioned PEM hydrogen fuel-cells. The disclosed method herein describes production of stable biochar-based monolithic and highly porous electrodes that can be used in a water electrolysis system to directly produce hydrogen gas and oxygen gas, which can be directly fed into a PEM hydrogen fuel-cell. Alternatively, the resultant hydrogen gas and oxygen gas produced via the electrolysis of water can be stored or transported for subsequent use in a PEM hydrogen fuel-cell for the generation of clean electricity with only water vapor as an emissions by-product. Still further, the hydrogen gas and oxygen gas can be combusted in an engine for clean non-$CO_2$-based power, likewise with only water vapor as an emissions by-product.

The disclosure herein is generally applicable to all varieties of ultracapacitors, pseudo-capacitors, batteries and fuel-cells, or used as electrodes in an water electrolysis based gas generator to produce hydrogen and/or to produce oxygen, due to the broadly applicable nature of the electrode device when such electrode is produced by the presently disclosed methods. For brevity, we hereinafter refer to the ultracapacitors as one of the end products incorporating electrodes produced by the disclosed method(s), since ultracapacitor performance is most greatly improved by the disclosed invention, and each other type of device (such as a pseudo-capacitor, a battery or a fuel-cell) are also suitable candidates for improvement using the product(s) of the disclosed method(s); however, all of the mentioned electric energy storing and converting devices are included, embodied and claimed as being improved by the methods of the present invention, as further described herein (including in the illustrative examples set forth below).

The rise in interest in ultracapacitor technology mainly focused on the development of the electrode material since the electrode material is the main determinant of the ultracapacitor's performance. Porous carbon materials have been widely used as electrode materials for ultracapacitors due to their high surface area and excellent electrical conductivity. Most of the research focuses on development of highly porous activated carbon materials with good electrical conductivity by using cost-effective biomaterials. These research groups and manufacturers fabricate the electrodes by combining activated carbon granules or powder or dust with an adhesive binder, then spreading the mixture onto a current collector plate, typically a thin foil such as aluminum foil, stainless-steel foil, titanium foil, and the like. Most activated carbon electrodes are made by charring the carbon-source precursor, such as tar pitch, such as saw dust, such as carbon-based polymer powder, such as coal such as coke, such as petroleum coke, such as graphitic materials, such as biomass, etc. These precursor materials are charred at high temperature in a furnace to form activated carbon powder or dust. This charring step is then typically followed by post-charring activation to form the activated carbon powder or dust using a strong acid, strong acid or base for demineralization, and carbon dioxide gas or steam, for pore generation. Typically, after one or more of these activation steps, the activated carbon powder or dust is mixed with an adhesive binder (up to 66% by weight compared to the active carbon material) to form a slurry or paste-like substance to laminate, coat, paste or print the slurry or fine powder activated carbonaceous material as a very thin layer (generally less than 200 μm thick) onto the current collector foil. Additional methods, such as electrophoresis, are used in an effort to bind the activated carbonaceous material onto the foil current collectors. It is noteworthy that this carbon-foil interface is plagued with problems of conductivity, adhesion and corrosion.

While the noted methods by others can be effective, these other methods certainly have their drawbacks. For example, the addition of the adhesive binder can block the channels and pores of the activated carbon material which may reduce the effectiveness of the activated carbon and dilute the overall carbon content in the finished electrode. Moreover, this fabrication method is limited to printing or coating a very thin layer of active carbon material on the current collector, resulting in poor electrical conductivity and poor volume utilization of the end product and high packaging overhead of the end device. The adhesion of the thin layer of activated carbon material can also fail or degrade.

The disclosed invention described herein utilizes an advantageous net-shaping process which results in a product that is a thick, highly porous activated carbon monolithic electrode with hierarchical pores and channels with high inner surface area and high volumetric capacity without the use of adhesive binders that are otherwise necessary to hold the activated carbon particles together via the methods of others. The disclosed method thus increases the total effectiveness of the produced monolithic electrode and minimizes the assembled end-product packaging overhead. Furthermore, the disclosed method avoids the creation of a dusty powder activated carbon that then would subsequently require binding and dilution and reduction of the desired electrical and physical properties.

SUMMARY OF INVENTION

The present invention discloses a process for fabricating net-shaped, high surface area activated monolithic carbon electrodes from pre-net-shaped biomass materials that are self-binding. Due to the self-binding properties of the biomass material as processed herein, there is no need for chemical binders. More particularly, the present disclosure relates to a process for fabricating a thick, net-shaped activated carbon electrode monolith that provides advantages in the design and fabrication of ultracapacitors, pseudo-capacitors, batteries and fuel-cells or used as electrodes in a water electrolysis based gas generator to produce hydrogen and/or to produce oxygen, with much lower packaging overhead, thereby allowing more electrode material against each of the current collectors (foils). This greatly increases the electrode mass and volumetric ratio of the electrode in the overall end-product.

More particularly, the present disclosure provides a method of formulating and tuning biomass-sourced electrode wafer properties through a series of steps, such as selecting the biomass material, and optionally pretreating the biomass. As disclosed in U.S. Pat. Nos. 9,478,324 and 10,121,563 to Favetta et al., exemplary pretreatments may include one or more of: (i) washing, retting, chemical treatment, demineralizing and drying the biomass, (ii) grinding the biomass to desired sizes, texture, friability, and absorbency, (iii) blending the biomass of different plant sources and different grind sizes/textures/friability/absorbency to achieve hierarchical component particle sizes and porosity, (iv) adding compatible solids or liquids that are not binders, to facilitate softening and self-binding of the biomass, and/or (v) pre-net-shaping the wetted biomass mix by pressing, with optional heating or baking, to form self-bound biomass wafers that are precursors to the biochar electrodes.

Furthermore, the present disclosure provides a method of charring the pre-net-shaped biomass wafer in a high temperature furnace, and optionally further activating the biomass-sourced self-bound charred electrodes to produce thick highly porous and activated net-shaped biochar electrode monolith wafers for use in ultra-capacitors, pseudo-capacitors, batteries and electric fuel cells or used as electrodes in a water electrolysis based gas generator to produce hydrogen and/or to produce oxygen.

Additional features, benefits and applications of the disclosed methods will be apparent from the detailed description which follows, particularly when read in conjunction with the appended figures.

BRIEF DESCRIPTION OF THE FIGURES

To assist those of ordinary skill in the art in practicing the disclosed methods, reference is made to the accompanying figures.

FIG. 4 is an exploded schematic depiction of an exemplary ultracapacitor according to the present disclosure.

FIG. 5 is a schematic sectional view of a carbonaceous monolithic biochar electrode assembled in a stack according to the present disclosure.

DESCRIPTION OF EXEMPLARY EMBODIMENTS

The present disclosure is now described with reference to exemplary implementations. As will be apparent to persons skilled in the art, the present disclosure is not limited to the specific implementations disclosed herein, but is susceptible to modifications, variations and/or refinements based on the disclosure provided herein. The present disclosure expressly encompasses such modifications, variations and/or refinements as would be apparent to persons skilled in the art based on the disclosure set forth herein.

Discussion of Appended Figures

Figure 1:
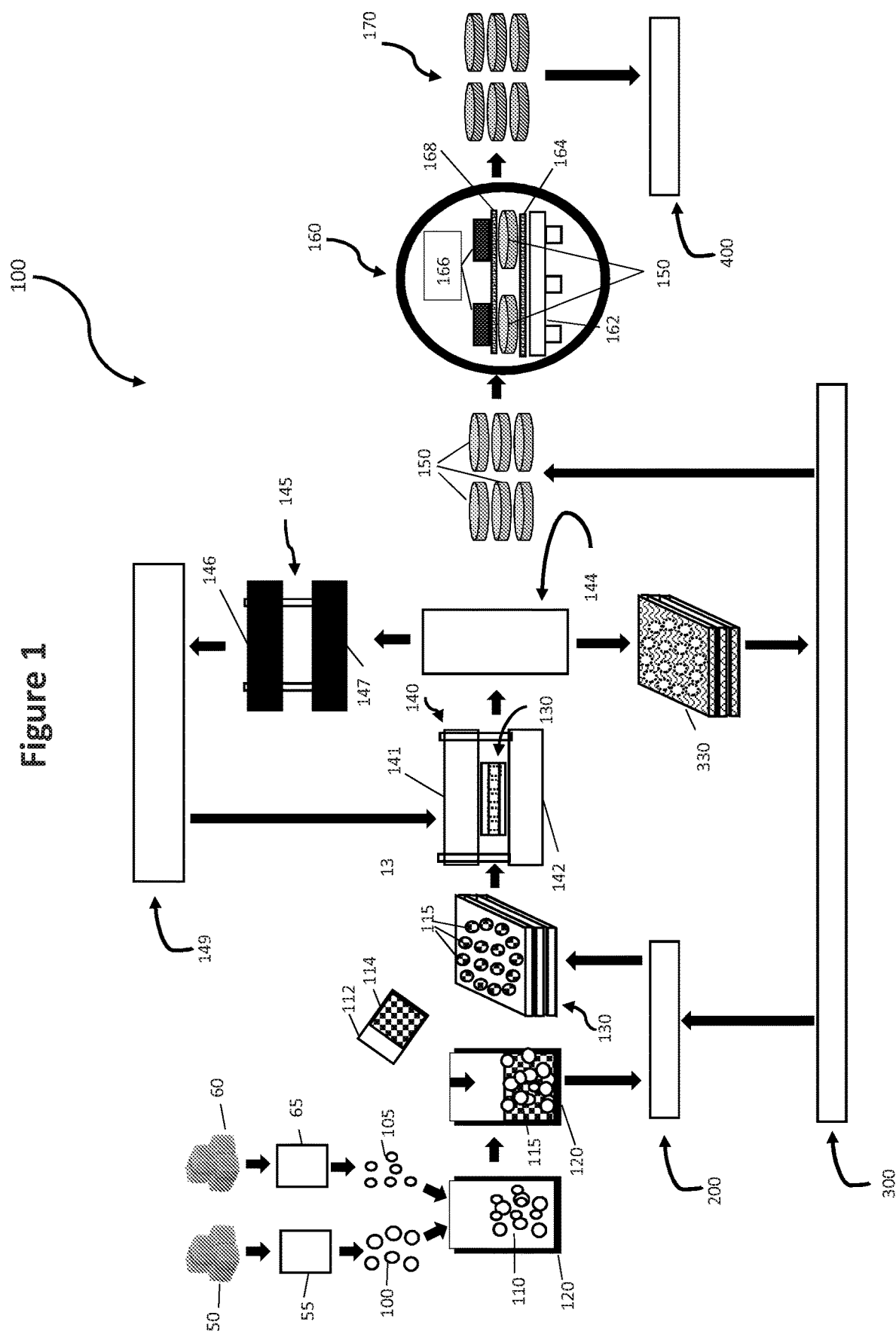
FIG. 1 is a schematic flow chart of an exemplary processing regimen according to the present disclosure for the grinding, blending, pre-net-shaping, heated pressing, charring and extraction of the Carbonaceous Monolithic Biochar Electrodes.

As noted above, FIG. 1 is a schematic flow chart (100) of an exemplary processing regimen according to the present disclosure for the grinding, blending, pre-net-shaping, heated pressing, charring and extraction of the Carbonaceous Monolithic Biochar Electrodes, including the following elements:

50 Biomass Selected for larger particle size grind
55 Biomass grinder configured for larger size grind.
104 Ground biomass large particles
60 Biomass Selected for smaller article size grind
65 Biomass grinder configured for smaller size grind.
105 Ground biomass small particles
110 Dry biomass blend of varies selected particle size and blend
120 Mixing vessel to blend biomass particles of varied sizes
112 Vessel containing pre-activating agents and/or progenitors
114 pre-activating agents and/or progenitors in vessel 112
115 Blend in 120 of required biomass blends (110) and pre-activators and progenitors (114)
130 Clean mold press plate assembly, additionally depicting biomass blend/pre-activators/progenitors placed into cavities on mold press plate assembly
140 Clean heated press system
141 Clean top heated press plate of 140
142 Clean bottom heated press plate of 140
144 The heated mold press process of (140) applied to the mold press plate assembly (130) that includes containment of the prepared biomass/progenitor mix (115) within (13), thereby forming the pre-net-shaped biomass wafers (150). Such mold press baking process causing leakage of some of the pre-activators/progenitors (114) exuding out onto the plate system (130) and onto the heated plates of the press machine (141) and (142), thereby causing them to become soiled/dirty and being converted to (146) and (147), respectively. Subsequent relief of pressure applied by the mold press system 145 to allow extraction of the soiled/dirty mold press plates (330) containing the baked pre-net-shaped biomass wafers (150)
145 The soiled/dirty heated mold press plate system (140)
146 Soiled/dirty top heated press plate of 145
147 Soiled/dirty bottom heated press plate of 145
149 A cleaning process used to clean the soiled/dirty mold press oven machine (145) returning it to a clean and usable state (140)
150 Pre-Net-Shaped biomass wafers extracted from mold press plate system, having been removed from (130), wherein (130) is now being depicted as the soiled/dirty mold press plate system (330), with further detail as to disassembly and removal provided in FIG. 3 (300) and FIG. 3A (350).
160 High Temperature charring furnace system.
162 Removable bottom tray of furnace system
164 Bottom screen mesh between bottom tray and pre-net-shaped biomass wafers thereupon.

166 Top weights

168 Top screen mesh upon pre-net-shaped biomass wafers and beneath top weights

170 Charred Monolithic carbonaceous biochar electrodes.

Figure 2:
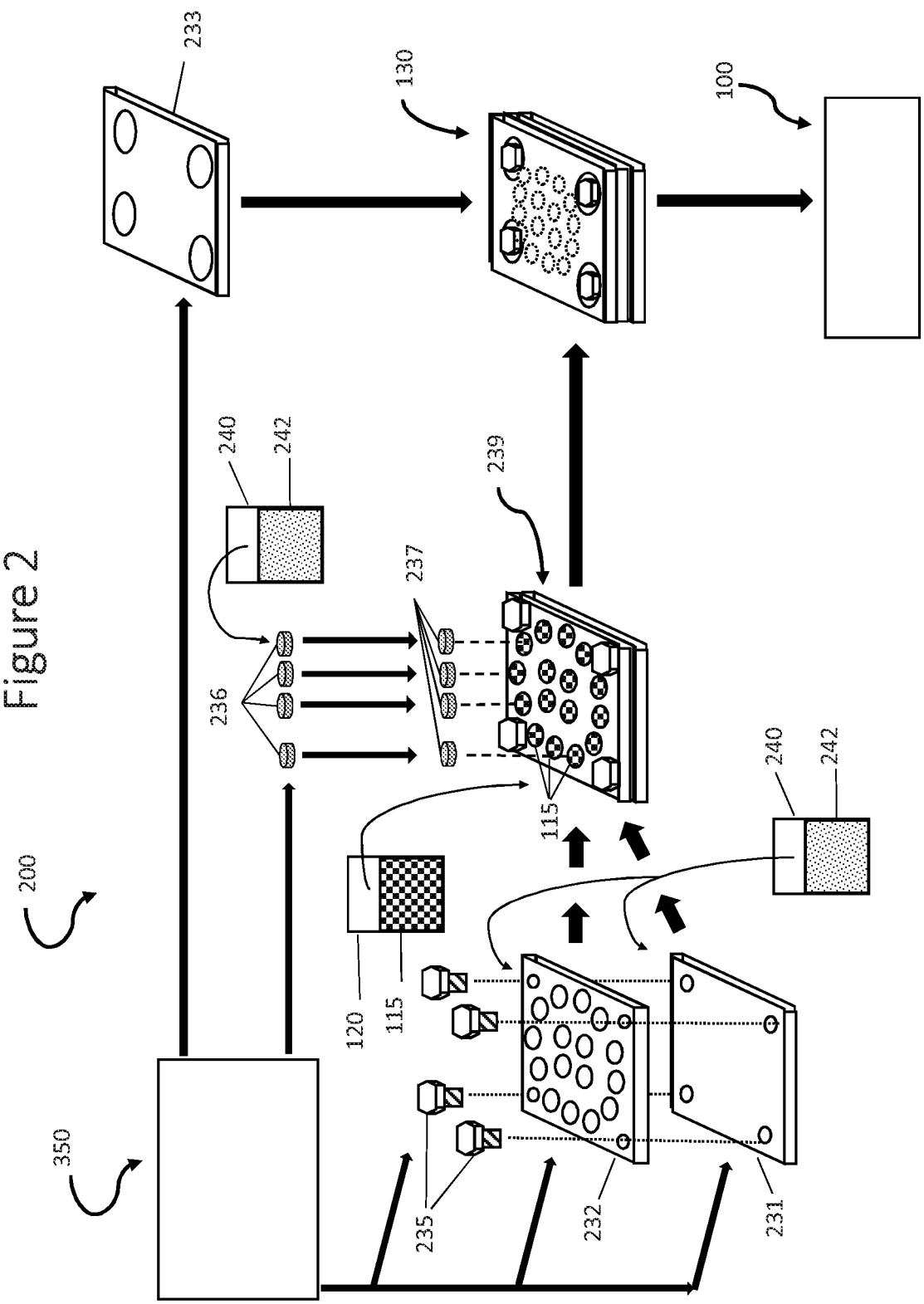
FIG. 2 is a schematic flow chart providing a more detailed depiction of the preparation of a clean mold press plate system according to the present disclosure.

FIG. 2 is a schematic flow chart (200) providing a more detailed depiction of the preparation of a clean mold press plate system according to the present disclosure, including the following elements:

200—flow chart outlining preparation of clean mold press plate system (130), its assembly, and the addition there into of the prepared biomaterial (115), said mold press plate system being comprised of parts 231, 232, 233, 235, 236, 237, amongst other components further described below.

321—The bottom plate of the mold press assembly

232—The center forming mold press plate with slotted or cylindrical holes to form the cavities when attached and fastened to 231.

233—The top press plate of the mold press assembly

235—Fasteners to assemble attach and hold together 231 and 232.

236—The Cylindrical slug press inserts that press the biomass blend (115) into the cavities of sub-assembly 239.

237—The wetted cylinder slug inserts (236) now wetted with non-stick lubricant mold-release 242 further described below.

239—The sub-assembly of 231, 232, 235, with biomass blend mix (115) added to the sub-assembly cavities and subsequently pressed into the cavities using (237), such sub-assembly parts all having been lubricated with mold-release material 242.

240—The vessel containing the mold-release lubricant 242.

242—The mold-release lubricant used to wet all parts of the sub-assembly 239 to prevent sticking of 115 when pressed in the heated mold press 140.

Figure 3:
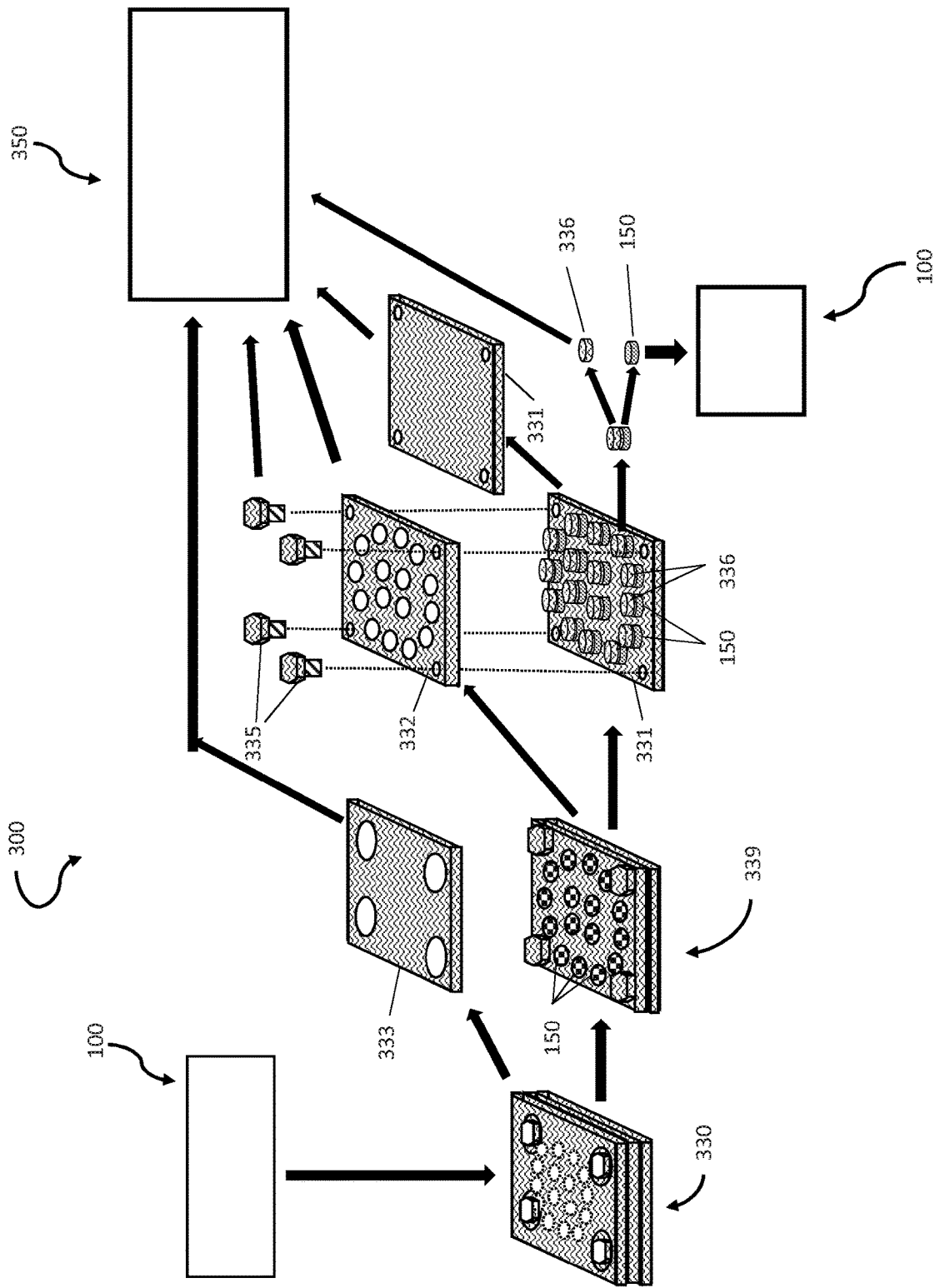
FIG. 3 is a schematic flow chart providing a more detailed depiction showing disassembly of the pressed, heated and baked mold press plates assembly according to the present disclosure.

FIG. 3 is a schematic flow chart providing a more detailed depiction showing disassembly of the pressed, heated and baked mold press plates assembly according to the present disclosure, including the following elements:

300 flow chart showing disassembly of 330, which is the pressed, heated and baked mold press plates assembly (130) having subsequently been pressed and baked in (140) and (145), and therein containing the pre-net-shaped biomass wafers (150), further showing mold press plate system parts and components formerly referred to as clean parts 231, 232, 233, 235, 236, 237, now as soiled/dirty components of the mold press plate system and renumbered as 331, 332, 333, 335, 336, 337.

330—The baked mold press assembly containing the pre-net-shaped biomass wafers within the cavities of the mold press plate system; furthermore, such that the mold press plate assembly is soiled and dirty on its surfaces.

333—The soiled top plate removed from the 330 assembly.

331—the soiled bottom press plate of the mold press plate system, further showing the resultant net-shaped-biomass wafers (150) beneath the soiled press slugs (336).

332—The soiled center plate of the mold press plate system.

335—The removed and soiled fasteners of the mold-press-plate system.

336—The soiled press slugs removed from the cavities of 332 and subsequently detached from the pre-net-shaped biomass wafers (150)

339—The still assembled sub-assembly of the mold press plate system with cover (333) removed.

350—A washing step to clean 331, 332, 333, 335, 336, thereby restoring them for service in the steps and procedures depicted in FIG. 2 as parts 231, 232, 233, 235, 236.

Figure 3A:
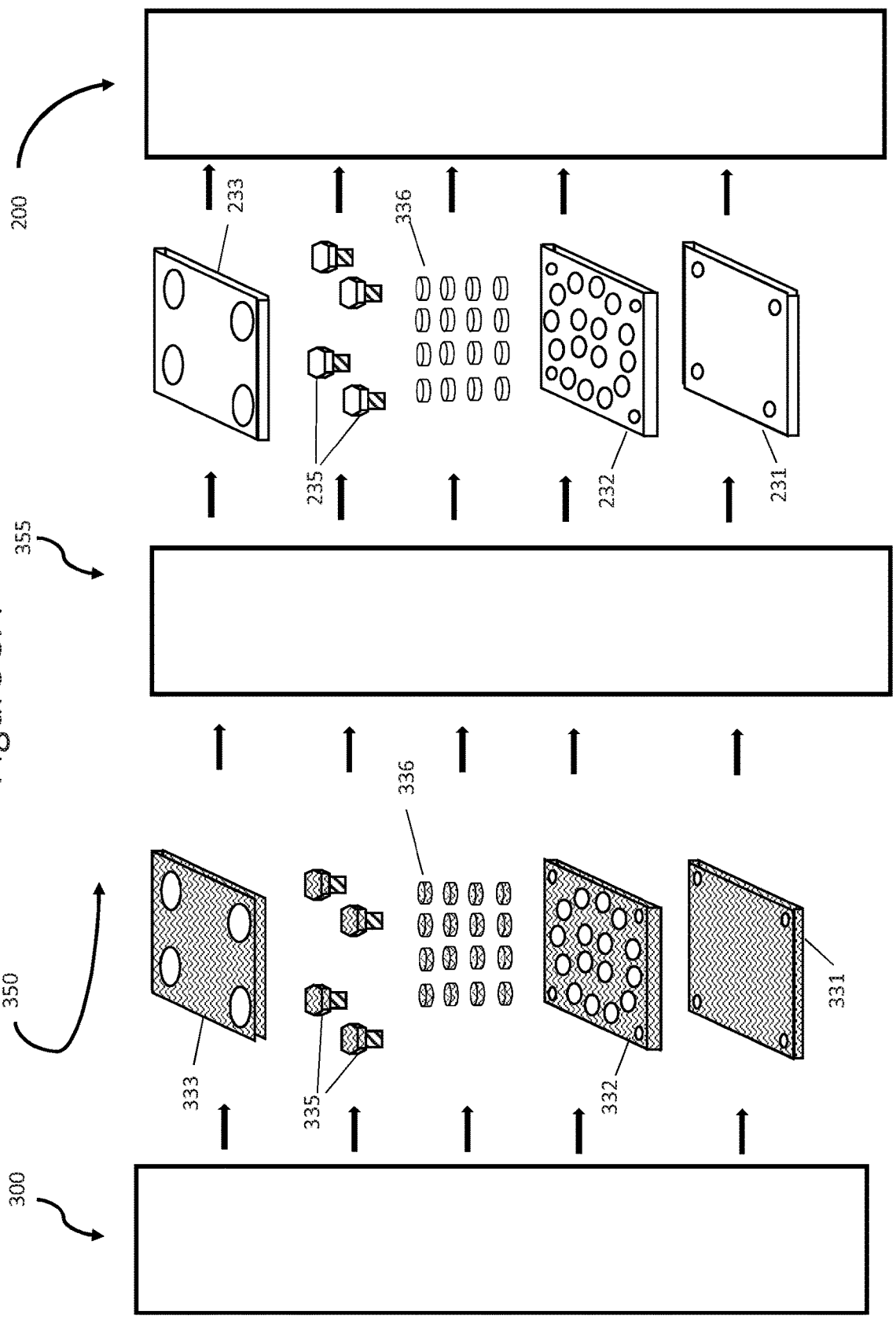
FIG. 3A is a schematic flow chart providing a depiction of the washing/cleaning step according to the present disclosure.

FIG. 3A is a schematic flow chart (355) providing a depiction of the washing/cleaning step according to the present disclosure, including the following elements:

355 Flow chart showing washing/cleaning step of parts 331, 332, 333, 335, 336, thereby converting them back to clean mold press plate components 231, 232, 233, 235, 236. FIG. 4 is an exploded schematic depiction of an exemplary ultracapacitor (400) according to the present disclosure, including the following elements:

400—An exploded schematic depiction of an exemplary ultracapacitor according to the present disclosure containing 410, (440), and (460).

410 The process by which the dry carbonaceous monolithic biochar electrodes (170) and the non-conductive porous separator membrane are wetting with an electrolyte (414) from a container (412)

412 The container holding the electrolyte (414)

414 The electrolyte used in the assembly of the embodiment of the electrode disclosed herein to fabricate the end-product electric storage device (440)

175 The dry non-conductive porous separator membrane

428 The electrode (170) that has been wetted with the electrolyte (414) to then be used as the embodied electrode for a given voltage polarity being opposite in polarity to that applied upon (430)

429 A conductive adhesive glue or epoxy used to affix and adhere (428) and (430) to (424)

430 The electrode (170) that has been wetted with the electrolyte (414) to then be used as the embodied electrode for a given voltage polarity being opposite in polarity to that applied upon (428)

432 The membrane separator (175) that has been wetted with electrolyte (414)

440 An exploded schematic depiction of an exemplary ultracapacitor according to the present disclosure showing detailed assembly order of each component on the end embodiment electric storage device 422—Non-electrically conductive end compression plates to press and hold the electric storage device together.

424—Electrically conductive charge collectors

426—Sealing devices of non-conductive elastomer, such as O-rings shown.

428—The top net-shaped Monolithic biochar electrode with electrolyte (414) thereupon and within, prepared by the disclosed method herein.

430—The bottom net-shaped Monolithic biochar electrode with electrolyte (414) thereupon and within, prepared by the disclosed method herein.

432—The non-conductive and porous membrane separator having electrolyte (414) applied to it there upon in (410), placed between (408) and (410), and sealed by (406).

440 A compressed and assembled side-view schematic depiction of an exemplary ultracapacitor according to the present disclosure showing detailed assembly order of each component on the end embodiment electric storage device FIG. 5 is a schematic sectional view of a carbonaceous monolithic biochar electrode assembled in a stack according to the present disclosure, including the following elements:

500 depicts a diagrammatic assembly of an embodiment of a carbonaceous monolithic biochar electrode (428) and (430) assembled in a stack, thereby allowing each of the voltage potentials stored within such a pair of electrodes (428) and (430) respectively to be additive within the end-device embodiment so as to produce a wholly contained end-device that charges, stores and delivers any desired voltage and end-device produced by the disclosures herein, and not limited by the voltage operating window of the electrolyte.

Figure 6:
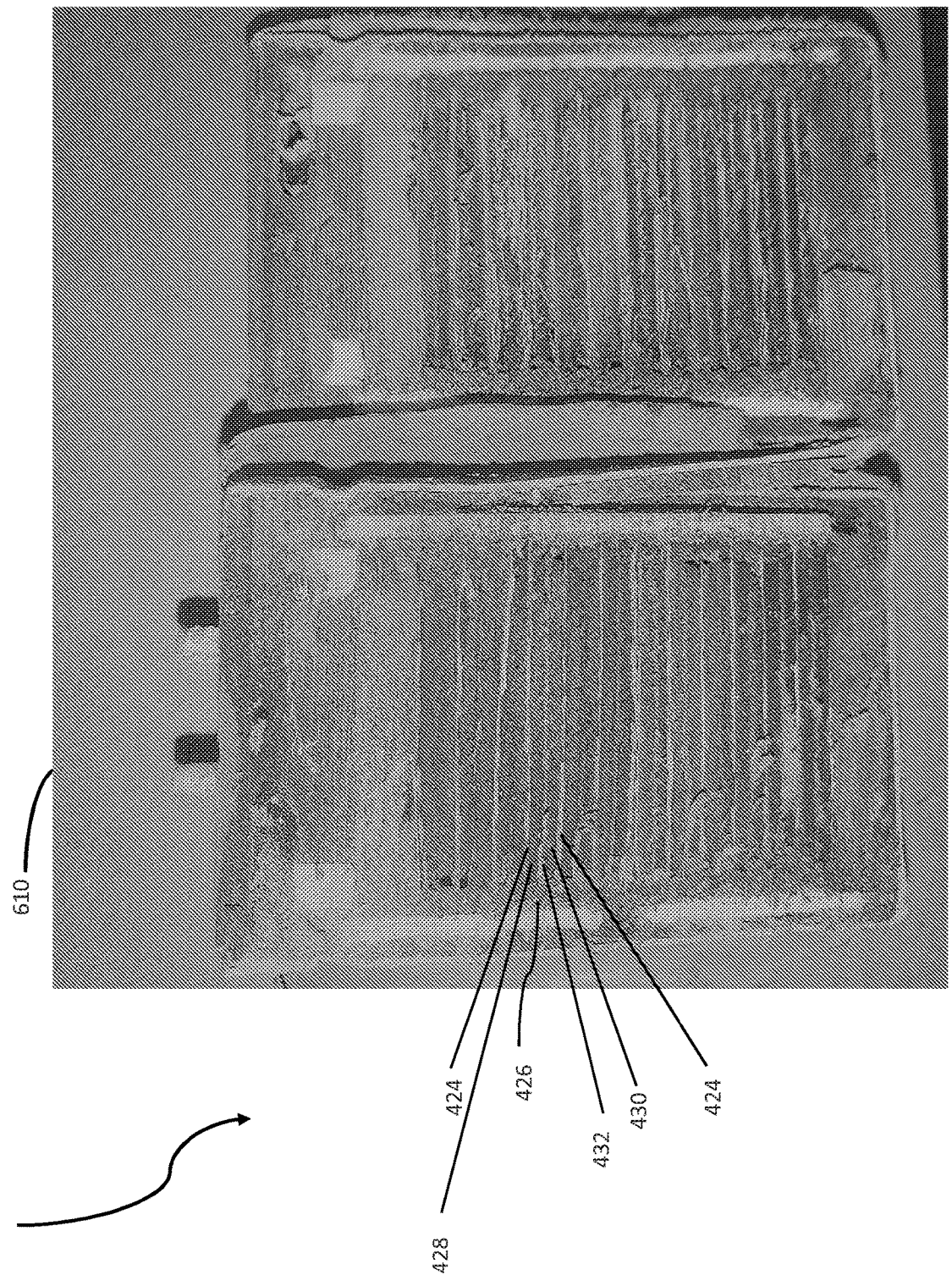
FIG. 6 is a photograph of an actual end-device (sawed in half by mechanical means) fabricated and assembled according to the disclosed methods to provide electric storage from one ultracapacitor device at 12 Volts DC.

FIG. 6 is a photograph (600) of the actual end-device (sawed in half by mechanical means) that was fabricated by the disclosed method and assembled according to (500) to successfully provide electric storage from one ultracapacitor device at 12 Volts DC.

Figure 7:
FIG. 7 is a Scanning Electron Microscope (hereinafter SEM) image of a biochar wafer that has been charred without using the disclosed off-gassing screen-meshes at a magnification of 40,480× according to the present disclosure.

FIG. 7 is an SEM image of a biochar wafer that has been charred without using the disclosed off-gassing screen-meshes at a magnification of 40,480× according to the present disclosure, as follows:

710 An image using a Scanning Electron Microscope of a biochar wafer that has been charred without using the disclosed off-gassing screen-meshes (164) and (168); of note, the image of (710) shows observable coatings of tars and caramelized sugars blocking the pores and channels. The SEM image providing datum of the magnification of the specimen as being 40,480×

Figure 8:
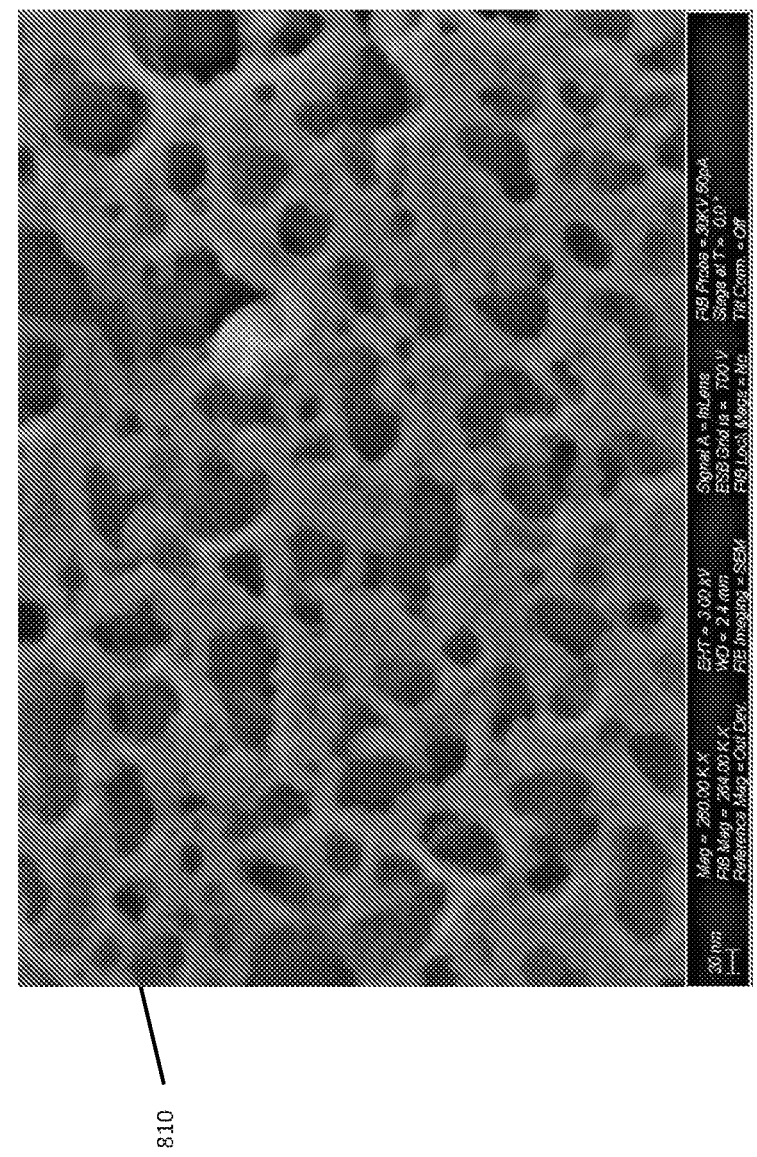
FIG. 8 is an SEM image (260,000×) of a biochar wafer having been charred with the use of the disclosed off-gassing screen-mesh and showing observable pores and channels providing superior activation effects for electric storage according to the present disclosure.

FIG. 8 is an SEM image (260,000×) of a biochar wafer having been charred with the use of the disclosed off-gassing screen-mesh and showing observable pores and channels providing superior activation effects for electric storage according to the present disclosure.

800 shows SEM image 810 of a biochar wafer having been charred with the use of the disclosed off-gassing screen-mesh (164) and (168); of note, the image 810 shows observable pores and channels providing superior activation effects for electric storage. The SEM image providing datum of the magnification of the specimen as being 260,000×

Figure 9:
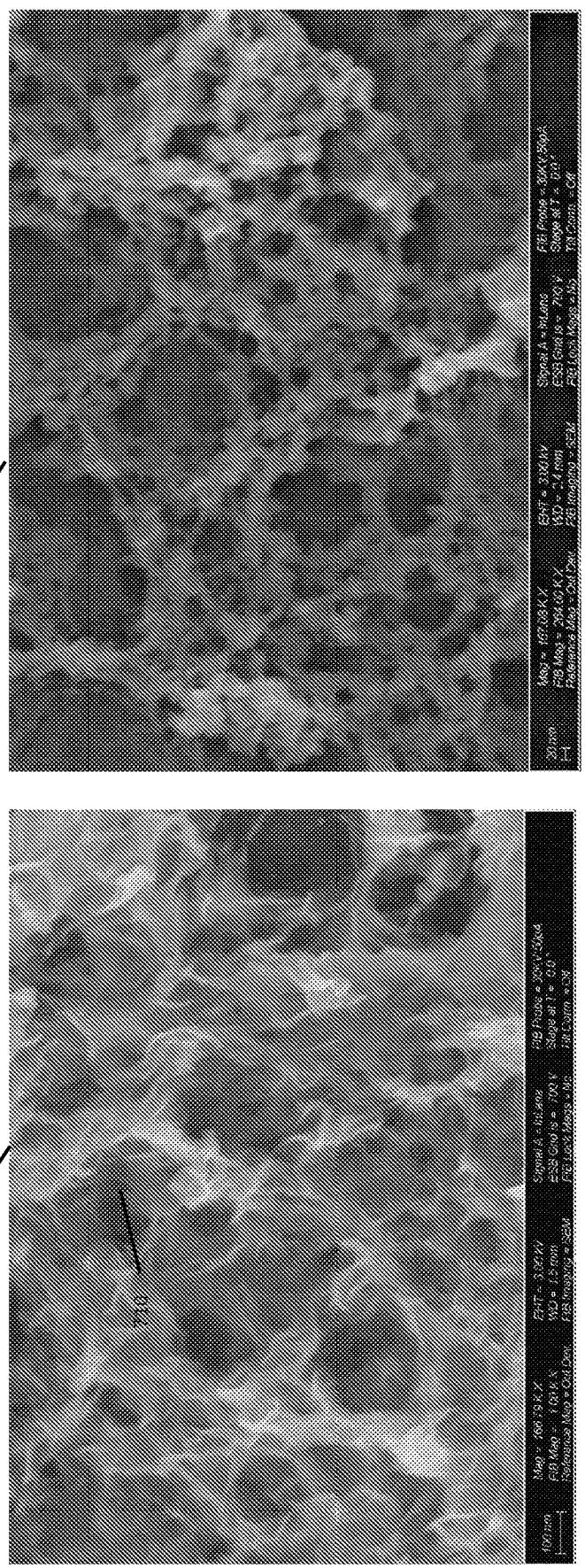
FIG. 9 provides two (2) SEM images of biochar wafers that have been gas-activated at elevated temperatures with $CO_2$ and with the use of the disclosed off-gassing screen-mesh at magnifications of 166,790× with FIB magnification of 1,000× and 167,080× with FIB magnification of 264,000×, respectively.

FIG. 9 provides two (2) SEM images (900) of biochar wafers that have been gas-activated at elevated temperatures with $CO_2$ and with the use of the disclosed off-gassing screen-mesh at magnifications of 166,790× with FIB magnification of 1,000× and 167,080× with FIB magnification of 264,000×, respectively.

910 An image of biochar wafer that has been gas-activated at elevated temperatures with $CO_2$ and with the use of the disclosed off-gassing screen-mesh. The SEM datum further indicates the magnification of the specimen of 910 is 166,790× with FIB magnification of 1,000×. Of note, 910 shows observable hierarchical pores and channels providing superior activation effects for electric storage.

920 An image of biochar wafer that has been gas-activated at elevated temperatures with steam and with the use of the disclosed off-gassing screen-mesh. The SEM datum further indicates the magnification of the specimen of 910 is 167,080× with FIB magnification of 264,000×. Of note, 920 shows observable hierarchical pores and channels providing superior activation effects for electric storage.

Formulating and "Fine-Tuning" of Material Properties of the Pre-Net-Shape Biomass Wafers:

Biomass Selection and Pre-Treatment:

Biomass source plant species selection, agronomic selection, harvesting method and timing, harvested biomass pre-processing washing, retting, chemical treating, demineralization, and drying of the biomass raw material are all key factors in producing a superior electrode according to the disclosed method. Applicant incorporates herein by reference two (2) previously issued US patents to Favetta et al., namely U.S. Pat. Nos. 9,478,324 and 10,121,563, which provide teachings of relevance to, inter alia, biomass selection and pre-treatment. The entire disclosures of the '324 and '563 patents are incorporated herein by reference.

Biomass Grinding to Facilitate Fabricating of the Pre-Net-Shaped Wafer:

Grinding of (above-sourced washed/dried) biomass materials is performed to generate biomass particles processed to a set of ranges of desired particle sizes, texture, friability and absorbency to be used as the precursor to generate hierarchical porous structure in the electrode once it is charred. In the disclosed method, a cadre of methods, including the use of consumer-grade coffee grinders, as well as a sophisticated Retch ZM-200 laboratory grinder with variable speeds up to 18,000 RPM, cutting rotors, and sieve type and sizes, may be used to produce the biomass grind as described specifically in the Examples and Counter-Examples section below. However, any effective milling method can be employed, including equipment such as consumer-grade coffee grinders, industrial milling machines, chain-saws, chipper-shredders, hedge trimmers, roll mills, ball mills, hammer mills, and the like. Thus, the present disclosure contemplates the use of any cutting or shredding device that may be employed to deliver desired particle sizes, texture, friability and absorbency. This array of devices may be substitutive (one or the other will suffice) for a given grind step or particle size requirement, or such device may be very specifically required, such as a specific rotating hammer mill blade size or profile of sizes with screen mesh size, a specific toothed rotor and cutting screen or cutting sieve size, or other specific combinations, based on the grind-size particle distribution and blend, and therefore the end electrode properties desired to be attained.

Biomass particle grind size and "fluffiness" is an important factor that affects and controls the intermediate pre-net-shaped biomass wafer self-binding, the wafer's release from and non-sticking to the process equipment, and is also important to the end-product charred electrode properties. Furthermore, these same starting properties are important to the post charring additional activation steps compatibility of the resulting charred electrode, and the electric storage performance, fuel-cell conversion performance or water electrolysis driven $H_2/O_2$ gas generator of the final monolithic electrode product produced according to the method.

The biomass grinding methods disclosed above may be employed according to the present invention to produce biomass grind particle sizes that may be termed "coarse" (i.e., where most of the particles are approximately 1 mm×5 mm), "medium" (i.e., where most of the particles are approximately 0.1 mm×2 mm), and/or "fine" (i.e., where all of the particles are less than 0.25 mm in any dimension). Optionally, more controllable scientific grinding methods may be employed to produce particle sizes of very narrow ranges of distribution as generated by the specific calibrated cutting screen or sieve devices, such as 500 µm, 200 µm, 120 µm, 80 µm, 25 µm, 20 µm, or the like.

Particle sizes less than 20 µm were not generated in exemplary implementations of the present disclosure since the self-binding characteristic differences of the pre-net-shaped biomass wafer were not distinguishable when including biomass grind particle sizes much below 80 µm, and the charring and activation and electrical performance of the end electrode devices were also not impacted by variability in the particle sizes below 80 µm. The actual results of these formulation blends are described in the Examples and Counter-Examples section below.

The various biomass grinds and sources as disclosed above are then blended to prepare a mix for fabricating a pre-net-shaped biomass wafer according to the present disclosure. This blending of various grind sizes and varied biomass sources and materials is next performed as an important method of adjusting final material properties and generating hierarchical porous structures and biomass self-binding attributes. Once the biomass grind blend is prepared, it must be wetted with a compatible liquid to form a paste, similar in consistency to damp sawdust, up to very wetted material, similar to cooked oatmeal. This added liquid is not an adhesive or binder for the biomass, but serves to soften the lignin, hemicellulose and cellulose surfaces and fluffy fibrous extension of the ground biomass such that these biomass components have open chemical bonds and are partly dissolved. These chemically-opened bonds and fibrils then cause the biomass surfaces and fibrous extensions to self-bind when the biomass is baked in the initial oven-press step. These liquid additives are either pressed out and leak out of the biomass pre-net-shaped mold press system or evaporate therefrom or participate in the organic polymerization of the biomass, not acting as an adhesive casting but may act as a co-polymer, depending on the chemistry as further described below.

Blending of two or more biomass raw materials or particle sizes is recommended at specified mass ratios such as 50% "medium" plus 50% fine, or 50% "medium" plus 25% "fine" plus 25% 80 µm. These exemplary blends are merely illustrative of the vernacular of the recipe (and are not limiting thereof), with actual good versus bad examples of biomass blending disclosed in the Examples and Counter-Examples section below.

Furthermore, the biomass source of the specific particle grind sizes must be given consideration to cause to be introduced into the final biomass blend the amount of lignin, versus hemi-cellulose, versus cellulose, versus other organic compounds such as sugars, polysaccharides, tars, natural oil compounds, isoprene, terpenes and their higher ordered polymers including sesquiterpenes, and naturally sourced or added chemicals, minerals, metals, and the like. Mineral content is further removed or added at the time of preparation and pre-net-shaped mold pressing of the blending of the biomass grinds, or in the prior washing and pre-treatment steps described above. Further relevant teachings are provided in the '324 and '563 patents previously incorporated herein by reference. The foregoing considerations have an additional effect in natural self-binding of the biomass, and in-situ activation in the furnace during high temperature charring or high temperature post-charring steps described below.

The blending of two or more biomass materials with different grain sizes and biomass sources and the additional wetting with liquid activators, progenitors and self-polymerizing compounds of the biomass allows the prepared biomass grind mixture to reinforce itself and self-bind the biomass particles together during the initial press-baking step in the heated press machine. As for the concept applied to the biomass blends, the finer particulate and fluffy fibrils of the biomass such as "fine" or 80 µm particles, activated by the self-binding progenitor agent predominantly performs as the bridge for the natural self-binding and as the natural self-binder within the biomass to hold together the longer, higher aspect ratio medium and coarse grind biomass material, thereby forming the ultimate net-shaped wafers with superior physical and mechanical properties. The contrasting difference of this disclosed method of pre-net-shaped biomass monolithic wafers versus other methods that utilize binders, is that all of the resulting components used in the presently disclosed method are of biomass and organically sourced when complete, leaving little to no residual polymerization or self-binding progenitors, and any such residual progenitor polymers and activators are further removed in subsequent steps, resulting in superior electrical and physical properties of the end product self-binding monolithic biochar electrode after high temperature charring in a furnace, high temperature activation and other post-charring activation steps. It is these superior physical and mechanical properties that allows the pre-net-shaped biomass wafers prepared according to the disclosed method to withstand the harsh charring conversion into a biochar monolithic wafer electrode, and for the resulting biochar monolithic wafer electrode to withstand the harsh in-situ co-charring and activation, or post-charring activation further disclosed below.

Mass ratio of biomass #1 (higher aspect ratio, bigger size particle) to biomass #2 (lower aspect ratio, smaller size particle) is generally between 1:10 up to 10:1. This ratio is measured on a dry basis (about 10% moisture) to bone-dry basis (below 1% moisture) of the biomass, and where moisture content should be measured to compensate for net mass of the actual biomass, as well as in-situ moisture content causing a dilution of the added activator and progenitor liquids, which should be compensated when preparing activator and progenitor the liquids' dilution, concentration and amount for addition to the biomass blend. Slight/light variance in biomass amounts and moisture and liquid concentrations and additions can be tolerated, but should be noted to maintain accuracy and proper performance of the biomass self-binding.

Additional biomass components of third, fourth, and so on, of particle size, plant source and pre-treatments can be used to further control and enhance the physical and chemical properties of the pre-net-shaped biomass wafer and consequently the physical, chemical and electrical properties of the final net-shaped charred thick monolithic biochar electrode element. These other additions to the basic "scaffolding" of the larger biomass grind particles and the adhesion by the finer fluffy smaller biomass grind particle sizes play a role in strengthening the end-product net-shaped monolith biochar electrode and serve to facilitate electrical or physical enhancements, such as during furnace charring, such as during post-charring high-temperature activation, such as during post-charring electrode activation by other methods (e.g., in applicant's contemporaneously filed PCT patent application entitled "Process for Producing Highly Activated Electrode Through Electro-Activation" (Serial No. PCT/US2020/025648, which is incorporated herein by reference).

In the experimentation and development, the dry mass loading of the biomass ranges from 0.1 g to 10 g per wafer; however, this mass loading was only limited by the sizes of the experimental die-presses and mold plates that were fabricated for this purpose, and is an extensive property of the product. Furthermore, for ease of fabrication of these die-press components an mold press plates, cavities and press slugs were shaped as matching cylinders, resulting in a pre-net-shaped wafers in the form of a cylinder and thus net-shaped monolithic biochar electrodes in the shape of a cylinder. Any matching cavity holes and press slugs can be used within the embodiment, such as oval, such as elliptical, such as square, such as rectangle such as any polygon, and may furthermore not be planar or flat but additionally can be curved, such as saddled such as cupped, as is set forth in the '324 and '563 patents previously incorporated herein by reference.

Any size and shape can be used and is encompassed by the disclosure herein. Ratio of the liquid-to-biomass ranges from 0.05 to 10 milliliter/gram biomass on a dry basis, and this is an important intrinsic property of the product and the process by which the end-product electrodes are fabricated and are dependent.

Density of the wetted pre-net-shaped biomass wafer can range from 0.5 grams/cm$^3$ to 4 grams/cm$^3$. This is a controllable property based on the ratios of fine, medium and coarse biomass blends, friability, fluffiness of each biomass grind, the particular biomass plant source, activator/progenitor liquid loading into the biomass and addition for the wetted biomass before baking into a pre-net-shaped monolith, and the baking pressure, time and temperature.

Use of agricultural selected products as inputs (e.g., Goldenrod, *Phragmites Australis, Miscanthus*, generic "oak", bamboo, coconut shells, nut shells, etc.) Additional information concerning selection of agricultural inputs is set forth in the '324 and '563 patents previously incorporated herein by reference.

Pre-Net-Shaping of the biomass wafers is performed in the absence of a binding agent. Naturally occurring or simple compounds are used as self-binding progenitors in liquid solution typically with water, such as protic acids, such as formic acid (e.g., found in ant saliva), acetic acid (vinegar), propionic acid, or, alternatively, common salts, such as potassium hydroxide salt (lye), sodium hydroxide salt, potassium chloride (salt peter), sodium chloride (sea salt), sodium carbonate, sodium bicarbonate, potassium carbonate, and/or potassium bicarbonate. These progenitor compounds that promote biomass self-binding are used to soften and "attack" the existing chemical bonds and surfaces of the biomass cellulose, hemi-cellulose and lignin, when optionally wetted and heated during press forming and low temperature baking to create the net-shaped biomass wafer, whereby then the biomass material reforms and rebinds to itself as the biomass wafer bakes in its pre-net-shaped form in the heated mold press machine.

Temperatures and times of the heated mold press processing generally range from 100° C. to 250° C. for a duration of 1 to 3 hours, depending on the planned target properties of the end-product electrode, biomass blend formulation, moisture of the raw biomass, and loading and concentration of the solid or liquid activators for self-binding. These solid or liquid activator compounds play no role in the binding of the biomass particles after the pressing and baking step is complete and only facilitate the self-binding of the biomass during the early stages of formation of the biomass wafer while baking in the heated press. Although some compounds may remain in the baked biomass wafer after the baking process is complete, such as those found in solid form prior to dissolving in water, e.g., potassium hydroxide, potassium chloride, sodium hydroxide, sodium chloride, sodium carbonate, sodium bicarbonate, potassium carbonate, potassium bicarbonate, and/or other liquid compound components, such as formic acid, performic acid, acetic acid, peracetic acid, propionic acid, hydrogen peroxide solution, these liquid compounds typically evaporate during the baking process or react into the biomass material forming conjugative compounds of the original biomass material or aid in self-binding polymerization of the biomass.

In addition, the disclosed process also relates to impregnating the biomass blend with a pre-activating agent to further enhance the activation and increase the surface area of the resulting electrode after separate furnace charring, such charring being a separate high-temperature step after the initial baking of the initial pre-net-shaped biomass low-temperature baking, and such charring typically done in a separate high temperature charring furnace as describe further below. The impregnation step disclosed herein relates to the addition of the common salts mentioned above, such as salts of a cation of Periodic Table Groups I and II alkaline metals and alkaline earth metals respectively, such as sodium, potassium, calcium, etc., and their anion counterparts, such as hydroxide, chloride, carbonate or bicarbonate, etc. These alkaline metal (I and II) cations remain in the biomass wafer after the low-temperature heated pressing baking step, and then when the pre-net-shaped biomass wafer is charred at high temperature in the high temperature separate charring furnace to form the resultant desired net-shaped biochar wafer electrode product, these salts behave as catalysts and activating agents promoting chemical oxidative and chemical reductive functions to consume and/or catalyze carbon and oxides of carbon to form $CH_4$ (methane), $CO_2$ (carbon dioxide), CO (carbon monoxide) and other carbonic gases, as is set forth in the '324 and '563 patents previously incorporated herein by reference. The production of these gases in the furnace form within the biochar carbon, and the escape of such gases from the biomass/biochar thereby de-oxygenating and de-hydrolyzing the biomass materials and reduces the carbonaceous lignin, hemicellulose and cellulose into pure carbon or near-pure carbon, as is set forth in the '324 and '563 patents previously incorporated herein by reference. This furthermore creates pores in the biochar as these gases escape, thereby activating the biochar and making it suitable for use as an electrode in an ultra-capacitor, pseudo-capacitor, battery, chemical/electrical fuel cell and other absorbent applications, such as liquid or gas purification, liquid or gas storage, hydrogen storage, water purification, or used as electrodes in a water electrolysis based gas generator to produce hydrogen and/or to produce oxygen. etc.

Pre-Treatment—Impregnating the Biomass Grind and Blend with Pre-Activation Enhancement Agents:

Addition of pre-activation enhancement agents to impregnate the internal structures of the biomass plant cells and to convert and/or remove undesirable components and for subsequent pore and channel activations can be performed. It should be noted that excessive amounts or contact time of these agents or excessive concentrations or temperature have an adverse and detrimental effect upon the biomass, causing total liquefaction of the biomass, destroying the solid and fibrous structure of the biomass and loss of the formation of the advantageous physical and electrical properties of the final electrode monolith disclosed and claimed herein. The concentration of these solids or liquids, the mass ratio of these solids or liquids to the biomass as well as the biomass grind (particle size distribution), blend of grinds, and ratios themselves of the target biomass blend, and the time and temperature of the solid or liquid contact time with the target biomass all have an effect on the performance of the biomass blend when forming the pre-net-shaping monolithic wafer in the heated press machine, and the performance of the pre-net-shaped monolithic wafer when charring in the high-temperature charring furnace, and in final activation steps of the biochar electrode wafer.

Pre-activation enhancement agent can be of acidic, basic or neutral in nature:

Soaking the biomass grinds in aqueous potassium hydroxide (KOH), potassium carbonate ($KCO_3$), potassium bicarbonate ($KHCO_3$), sodium hydroxide (NaOH), sodium carbonate ($NaCO_3$), sodium bicarbonate ($NaHCO_3$), or other similar common basic or neutral salts, and any blend of such salts therein can be performed. These activations for self-binding tend to preferentially attack the hydroxyl groups on the cellulose and hemicellulose with only some effect on attacking the predominantly carbon-ring based lignin of the biomass. Furthermore, these methods impregnate the Cation ($K^+$, $Na^+$, $Ca^{++}$) into the biomass which then facilitates biochar pore creation and activation in the subsequent high temperature furnace charring step. This basic salt or neutral salt addition option disclosed herein allows for the I or II Cations ($K^+$, $Na^+$, $Ca^{++}$, etc.) to catalyze the oxidation and reduction of the carbon and carbon bonds of the biomass/biochar while undergoing high temperature furnace charring to thereby create hierarchical channels and pores in-situ within the biochar electrode. A delicate balance of the amount of such I or II Cations must be observed. Such catalyzation and carbon reactions by the I and II Cations can weaken the carbonaceous scaffolding backbone structure of the biochar electrode, making additional post charring activation steps slightly more challenging to avoid physical breakdown, but creates more advantageous pores for ion transport into the electrodes for electric energy storage. Care must be taken to induce uniform blending of these additives into the biomass particle blend, avoiding clumps and pockets of non-homogeneous addition, and observing the mix prior to mold-pressing to detect detrimental decomposition of the biomass to undesirable near paste-like consistency.

Aqueous solutions of hydrogen peroxide or of an acid such as formic acid, performic acid, acetic acid, peracetic acid, nitric acid, boric acid, or other protic or aprotic acids, diluted in water to the concentrations disclosed can beadded to the biomass blend. This facilitates the needed binding by activating the biomass surfaces and/or participate in the polymerization of the biomass self-binding. This can be added to the biomass grinds before final pre-net-shaping in the mold-press heated oven. These protic or aprotic acids or organic acids favor reaction with the lignin and aromatics or carbon cyclic structures and tend to enhance self-binding via the lignin route, versus the cellulosic reaction route predominant in the salt or basic solution addition described above. These acids do also further breakdown the cellulosic and hemi-cellulosic structures, thereby enabling these natural biomass compounds to reform and polymerize in both the pre-net-shaped biomass wafer formation in the heated mold press machine baking oven and also in the subsequent high temperature furnace charring step. The organic acid addition disclosed herein results in better biomass binding versus the basic or neutral salt addition method also disclosed herein and therefore the acid addition option provides for a more durable carbonaceous scaffolding structure of the end biochar electrode. This then allows for higher probability of success in achieving a mechanically stronger end electrode product capable of withstanding several pore-generating activation steps to produce a superior performing electrode via this pathway.

A hydrocarbon solvent such as toluene, such as ethanol, such as di-methyl-formamide (DMF) can also be added to the biomass grind blend prior to introducing the biomass/chemical blend to pre-activate the natural polymers in the biomass (lignin, hemi-cellulose, cellulose) by softening and/or dissolving a fraction of these biomass compounds, more specifically the fine and fluffy fibrils, and allowing them to reform and self-bind. Such organic solvents typically do not remain in the end biomass pre-net-shaped wafer due to evaporation in the low temperature mold-press baking oven machine, and any slight amounts of such residual solvent further remaining in the pre-net-shaped wafer from the oven press is eliminated by evaporation during the early stages of heating in the high temperature charring furnace, prior to the actual final charring temperature and charring effect being achieved.

Pre-activation enhancement agent can be solid or liquid. Up to this point in the disclosed method, the additive activator that facilitates self-binding of the biomass is described as being typically a liquid, with some reference to solids addition being feasible. Other refinements to the method disclosed herein were performed with good success by the addition of only solid activators in the form of fine powder or crystalline solid to the biomass grind blends when preparing the biomass material for the initial production of the pre-net-shaped wafer in the heated mold press oven. This addition of the salts or acids in the form of only solids leverages the moisture content in the biomass and works well when biomass moisture is above 15% by weight, with the additional aid of adsorbed ambient moisture in the solid additive which is common for compounds such as solid potassium hydroxide, etc. Further moisture to assist in the disassociation of the solids' ions is generated by the limited biomass breakdown caused by the solid as hydroxyls in the biomass breakdown and form water. Care must be taken to perform good mixing of the solids for uniform blending of the solid into the biomass grind blend, and longer contact times for the treatment due to the slower transport of the disassociated solid salts around and into the biomass material, to facilitate the chemical activation of the biomass self-binding effect.

Mass ratio for biomass to pre-activation agent generally ranges from 1:10 up to 10:1.

Alternatively, treatment of the biomass grind blend or into the pre-net-shaped wafer using removable templating agents (such as salts, waxes, etc.) that can be removed through melting, washing, charring or burning, whereby the templating is used to introduce and cast a controlled porosity into the pre-net-shaped biomass wafer bulk structure and subsequent biochar electrodes can be performed.

Pressurized "hydrothermal" treatment of the raw or ground biomass at the gas/liquid interface of the biomass while submerged or wetted with a liquid, to solvate and selectively and controllably extract minerals from the biomass or partially or wholly depolymerize the biomass for dramatic increase in surface area and remove detrimental elements of the biomass (such as silica, metals, iron, etc.) can be performed as is disclosed in the '324 and '563 patents.

Pre-Net-Shaping—Pressing the Mix into a Pellet or Wafer:

Use of pre-treatment methods to the biomass, thereby to affect or control net-shaped wafer properties is disclosed in the '324 and '563 patents.

Optimizing the press time, formulation, pressure and compression force to adjust the material structure parameters.

Ranges for pressing time in the low temperature baking oven when forming the pre-net-shaped biomass wafers are generally at least 45 minutes, up to 180 minutes. Little benefit has been realized in testing when greater than 180 minute bake times of the wafer were used, and the wafers dried out and were brittle and weak.

Pressure of the heated mechanical press generally ranges from 10,000 to 60,000 lbs in the heated press, with consistent and superior results when pressed at 30,000 lbs of force in the heated press. Since the actual pressure on the biomass mixture in the cylinder mold press is based on this force pressure divided by the actual face surface area of the total number of press cylinders, the actual pressure on the baking biomass biscuit in the heated press oven is as follows:

The circular area of each cylinder hole and matching cylindrical press slug used for experimentation is 1.25 sq.-in. The mold press plate system used for experimentation incorporated 16 cylindrical cavity holes. Therefore, a total biomass press area of 20 sq.-in. was used. When the heated press machine force of nominally 30,000 pounds is divided by the 20 sq.-in. of face surface area, the result of 1,500 psi is the force applied in most experiments when pressing and baking the biomass mix into a pre-net-shaped biomass wafer. The many varied embodiments, shapes, number of cylinders, therefore wafers per mold apparatus would thereby require adjustments to the total force applied to the heated press. Furthermore, the dimensions of, and number of holes, cylinders, and mold plate dimensions are not limited to the particular embodiment disclosed above.

Pressing temperature and temperature cycles applied to the pre-net-shaped biomass in the heated baking oven can be controlled to modify the pre-net-shaped biomass wafer properties by carefully controlling the Maillard-like reactions, torrefaction, and caramelization of sugars that are present in the biomass or further formed with the addition of the activating agents and self-binding progenitors. These process conditions and the additives control the physical properties and durability of the resultant pre-net-shaped biomass wafers and, more specifically, the final properties of the carbonaceous final net-shaped monolithic biochar products when charred in the further disclosed furnace charring step.

Temperature ranges for pre-net-shaped wafers in the mold-press low temperature oven baking step provides best results between 80° C. to 250° C. The temperature range for the pre-net-shaping process is very selective due to the sensitive effect it has on the formation of the self-binding biomass of the wafers. Below the lower temperature limit, binding effect of the fine biomass is not activated. The lower baking temperature also limits the evaporation of the water solvent for the salt solutions and evaporation of the organic liquid acids or solvents, and prevents the hardening of the biomass wafer which results in loose and powdery or mushy wafers that mechanically fail and break when handled or removed from the mold press. Above the higher temperature extreme, the wafers burn, caramelize, and dry out resulting in over-hardening, increased sticking to the mold-press plates, caramelization and bad performance in the subsequent charring and activation steps, caused by collapse of the pore and scaffolding structure, greatly inhibiting the end-product biochar electrode activation.

Heated mold-press conditions of the low temperature press oven are expected to be varied for different uses of the self-binding progenitors and pre-activation agents. Press conditions (pressure, temperature, and time) should be adjusted according to the pre-activation agent used to allow the pre-activation agent sufficient amount of time, heating and pressurization to perform its tasks, such as self-binding, digesting, oxidizing, reducing, etc.

Organic mold release agent(s) can be applied to the mold-press oven equipment to prevent sticking and damage to the wafers when removal of the wafers is attempted post baking. Organic oils are preferred. The preferential use of olive oil, corn oil or canola oil, or blends thereof was found to be suitable to minimize but not totally prevent wafer sticking and wafer damage when removed from the mold-press plates extracted from the low temperature baking oven. Note however, other oils or fats can be used, since these are all compatible with the biomass, but it is recommended that any such oil or fat applied to the mold-press surfaces have a low smoke point and burn off quickly once the pre-net-shaped biomass wafers are placed in the subsequent high temperature charring furnace. These mold release oils should have no adverse effect when converting the biomass net-shaped wafer into a net-shaped biochar electrode. It is discouraged to apply high-temperature tolerant oils or lubricants, such as silicone oil as a mold-release since they are stable, not carbon-based and will not react with the biomass or adversely react with the biomass, nor will they evaporate at the needed early points in the furnace charring step, if at all. This could then result in non-electrically conductive coatings within the electrodes channels and pores, having devastating effects to the electrodes' performance at its end use.

High Temperature Charring

The pre-net-shaped biomass wafers are charred at elevated temperature in a furnace in the presence of inert gas to convert to them to net-shaped biochar electrodes.

Temperature of the high-temperature charring furnace is generally between 700-1100° C.

Charring time duration at the peak high temperature is generally 30 minutes to 120 minutes. Less time is generally inadequate for charring, causing reduced final scaffolding of carbon structures and channel and pore generation. More time either provides little or no beneficial additional strength from scaffolding of the carbon structures nor additional channel nor pore generation, and furthermore has the negative effect of pore and channel shrinkage, negatively impacting the electrode's electrical performance. It should be noted that some limitations to temperature must be used based on the original pre-activation soaking of the biomass and self-binding progenitors added, such as the inclusion of I and II Cation salts, such as potassium, sodium, calcium or other metals, which can become over active and catalytic at the higher temperature ranges, such as above 800° C. With these ions present in the biochar while charring, it is possible that total gasification of the biomass/biochar material can occur, resulting in only a small residue of ash remaining in the high temperature charring furnace where the product biochar electrode was expected to be found.

Additional activation can be achieved in the high-temperature charring furnace or a separate subsequent high-temperature furnace step by introducing an activation gas such as carbon dioxide ($CO_2$), such as steam made of water vapor ($H_2O$), preferably vaporized separately but could be added, dosed, injected or inserted by any safe means as liquid water directly to the high temperature furnace, with mechanical and metallurgical design considerations made. A small amount of these activation gases can be introduced into the furnace once the charring temperature (800° C. to 950° C.) is reached. This allows the $CO_2$ (g) or $H_2O$ (g), or combination thereof to react with the carbon structures of the biochar electrode to cause the reverse Boudouard Reaction (for addition of $CO_2$) or steam-carbon reaction (for addition of $H_2O$), respectively, to remove carbon atoms and further widening the pores of the biochar monolithic electrode material, thereby increasing the internal surface area, creating additional pores, and creating hierarchical channeling throughout the 3-dimensional structure of the thick monolithic biochar wafer electrode scaffolding. This activation step is to be performed at or above the charring temperature and should be meticulously monitored and controlled to prevent over-gasification which may destroy or consume the net-shape carbon structure and reduce it to carbon powder or completely react all carbon therein, resulting in a residue of only ash. Gas activation can be done at several steps in the high temperature charring process. It can be done during the initial biomass charring, directly after charring in the high temperature charring furnace with no cool down in between the two separate steps, or as a separate step, having allowed the charred wafers to cool down, and optionally be treated with an additive or wash step, such as addition of a liquid identified disclosed in the aforementioned biomass pre-treatment step, such as aqueous potassium hydroxide, such as sodium hydroxide, formic acid, performic acid, acetic acid, peracetic acid (and the like), and then the (optionally wetted) biochar wafers are re-elevated in temperature as specified above for this second liquid-based activation step or the $CO_2$/steam activation at elevated temperatures between 800-950° C. in a furnace.

Flowrate and total mass of the delivered activation gas is generally based on the concentration of the gas, possibly mixed with each other or mixed with an inert gas for flow condition considerations, and the total mass of the biomass/biochar to be treated. Best results are generally achieved when the gas flow rate is between 0.001 $ft^3$/hour/gram biomass to 0.10 $ft^3$/hour/gram biomass on a pure-gas basis. When the activation gases are co-blended or optionally also mixed with an inert gas, such as argon, helium or a carrier gas, such as nitrogen, then the flow rates and pressures must be adjusted to meet the actual activation gas delivered on a pure base, adjusting for concentration or partial pressure of these blended gases flowing into the furnace. This flowrate and total mass of activating gas delivered into the furnace should be adjusted to the total mass of the wafer material in the furnace and degree of activation attempting to be effectuated.

The biomass charring step in the high-temperature charring furnace is disclosed as follows. The pre-net-shaped biomass wafers are placed on a flat tray in the furnace. The tray is generally fabricated from a metal or ceramic material that can withstand the severe temperatures in the furnace during charring as well as the corrosive atmosphere generated in the furnace during charring caused by off-gassing compounds and treatment gases added to the furnace. In the exemplary embodiments disclosed herein, Inconel alloys were used to fabricate the furnace trays. The furnace chamber walls were also fabricated from Inconel.

The pre-net-shaped biomass wafers to be charred are placed directly on the tray or are preferentially placed on a porous substrate, such as Inconel screen mesh below the biomass and on top of the biomass before an Inconel or ceramic weight is placed on top of the stack. This arrangement serves two purposes. The screen mesh allows the charring biomass wafer to "breath" out the off-gases from the pyrolysis occurring while charring, thereby preventing or minimizing the formation of carbonaceous film or "crust" on the outer surfaces of the biomass wafers facing against the bottom tray surface and the top weigh down plate surface while the biomass pyrolyzes and converts to monolithic net-shaped biochar. Secondly, the top weight forces the charring wafer and screen mesh layers to remain flat or net-shaped, minimizing or eliminating any undesirable curling, saddling or cupping of the biochar as the biomass wafer shrinks in all dimensions and reduces in weight and size and as it hardens into a monolithic net-shaped biochar electrode. Note that the herein described "flat" bottom tray and "flat" top weight can be other shapes and curved surfaces in other embodiments to match non-planar shapes induced into the biomass in the prior heated oven press step, or create or induce shapes of the electrode directly in the high temperature charring furnace. These non-planar embodiments are disclosed in the '324 and '563 patents and are incorporated herein by reference.

The target temperature of the furnace is generally between 700 and 1100° C., with best results between 730° C. and 850° C., by the addition of heat from an external heat source, such as electric heating elements, gas-fired burners, liquid-fired burners, and the like. [See, e.g., the '324 and '563 patents] These heating sources can be in direct contact or exposure to the furnace outer walls or can provide the heat by conveyance of the heater exhaust or combustion products through a duct. Since inert gas, such as argon, helium, or nitrogen, can be used to purge the furnace internals, the charring heat source can be applied directly into the furnace chamber by heating the purge gas before it enters the furnace chamber. Obviously, insulation should be applied to the furnace exterior in such heating configuration embodiments. Lastly, a combination of both internal and external heating of the furnace can be performed.

The peak charring furnace temperatures are achieved at a ramp rate from ambient to final peak charring temperature by temperature increases, e.g., 8-10° C./minute toward the target temperature. The charring time measurement as disclosed begins once the furnace internal temperature reaches the target temperature. The charring time generally has a duration of between 30 to 120 minutes once the furnace is at and above the target charring temperature.

The internal chamber of the charring furnace is purged with an inert gas, such as argon, such as helium, or a neutral non-reactive or minimally reactive gas such as nitrogen. It is critical to note that oxygen and "air" must be removed from the furnace internal chamber prior to the internal furnace temperature exceeding 100° C. to avoid oxidation or total destruction of the biomass once at elevated temperatures above 250° C. This air removal is typically accomplished via adjustment the flow rate of the purge gas into the furnace to cause enough total purge gas volume through the furnace equal to or above at least 5 volumes of furnace internal space within the initial 5 minutes of furnace heat up. Once high purging flow rates and required volumes are complete, the purge gas flow rate may be reduced to the desired minimum of zero to 20 furnace volumes per hour. Once biomass charring in the furnace is complete based on time and temperature guidelines disclosed above and demonstrated in the examples and counter-example section below, the charring furnace can be cooled down.

Charring furnace cooldown is generally accomplished by use of an external stream of air, that flows around the outside of the furnace chamber (not internally) and optionally a continued or higher flow rate of the cool stream of the purge gas for internal cooling is applied to the furnace, thereby cooling the furnace and the biochar wafers and stopping the charring process. This forced external and internal cooling step can be omitted and the furnace can be allowed to cool by normal surrounding atmospheric convection, heat radiance and heat conduction; however, it should be clearly understood that such ambient cooling slows the cooling process, and effectively adds charring time to this furnace charring step by maintaining the charred net-shaped biochar electrodes at elevated temperatures beyond the planned and intended charring time-temperature profile. This can have unpredictable results in the properties of the biochar electrode due to the uncontrolled nature of the time-temperature cooldown profile and random extended charring time that occurs if the disclosed forced cooling is omitted. The disclosed forced cooling acts to stop the charring process much sooner once the desired charring is complete and allows for more control of the resultant properties of the biochar electrode wafers exiting the furnace once cooled enough to halt any further chemical conversion. Furthermore, the furnace should not be opened to atmosphere, ambient air or oxygen while the biochar wafers are hot because auto-ignition of the biochar can occur and undesirable oxidation of the carbon biochar electrode material will occur. The cooling air for the outer cooling of the furnace can be sourced from a common compressor or air pump or fan preferably at room temperature (e.g., about 25° C.). Optionally, near-saturated steam (slightly above 100° C.) may be used to externally cool down the furnace from the charring temperature down to about 150° C., after which ambient air cooling or air flow as described above can complete the furnace cool down. These times and end-temperatures are dependent upon the mass of the charring furnace, furnace internal configuration and biochar loading in the furnace, and generally takes about 90 minutes, after which the furnace can be allowed to completely cool down to room temperature by simple exposure to the ambient air and thereafter the cooled furnace can be subsequently opened to remove the net-shaped monolithic activated biochar electrodes.

EXPERIMENTAL RESULTS

Experiment #1

Pre-net-shape wafers were formulated from 50% of Medium grind and 50% of 80 µm grind dry mass ratio, of a proprietary biomass mix, at 0.65 g per wafer. A pre-activation solution which contained 10% KOH (wt/wt) in distilled water was prepared. The mass ratio of KOH solution to dry biomass was 0.60 g of KOH(aq) solution to each 1.0 gram of biomass, with a total of 12.0 g of biomass being treated for preparation in the low temperature mold press oven. The solution was added to the dried biomass dropwise and mixed thoroughly and allowed to rest for 15-30 minutes. For the pre-net-shaping of the biomass into wafers, a metallic mold plate system was used which consisted of three plates of stainless-steel, each 5/16" thick, with the center plate being the mold plate with cylindrical openings. To prepare the mold plate, an organic mold release (olive oil) was sprayed on the middle and the bottom plates of the mold. The lower and middle mold plates were secured with five hex nuts, 3/8" diameter×16 pitch, 3/4" long, creating a mold tray. The pre-activator wetted and/or progenitor-wetted biomass mixture was then distributed evenly and homogenously into the cylindrical holes of the middle mold plate, accounting for biomass, pre-activating agent and distilled water. Metallic cylinder slugs were wetted with olive oil on all sides. Then the oil-wetted metallic cylinder slugs were inserted into each mold cylindrical slot hole that was filled with the biomass blend to thereby compress the biomass evenly. These metallic cylindrical slugs were designed and fabricated to fit into the mold press-plate cylindrical openings with minimal side clearance and of a height less than the depth of the mold press plate cylindrical well holes, leaving a designed gap space beneath the metallic slugs while residing in the mold press plate cylindrical well holes. This gap space is that space which forms the pre-net-shaped biomass wafer when fully pressed as described below. After filling the mold press plate cylindrical holes with the biomass mixtures and inserting the cylindrical oil-wetted metallic press slugs into the same press-plate holes, this was followed by the placing of the top plate over the entire assembly, to evenly press down on the cylindrical slugs and compress and pre-net-shape the biomass. Openings in the top plate allow for the hex nut heads of the bolts that were holding the two lower plate assemblies together to not interfere with the mold pressing assembly. Several sets of the cylindrical slugs were customized, all having tight side wall clearances to the cylindrical holes in the middle piece of the mold plate section, and these cylindrical slugs have specific height to obtained different thickness of the pre-net-shaped biomass wafers based on the gap below the cylinder when placed in the mold press cylindrical well hole. The cylinder slugs' height usually accounts for 60-90% of the cylindrical holes' height/gap, thereby also setting the disclosed compression ratio of the biomass from a loose blend state to a compressed state. The entire stacked mold plates, incorporating the base, the shape mask (cylinder hole) layer and the top press plate layer were pressed in the heated hydraulic press (Carver, Inc.) at 120° C. for 1 hour, to form pre-net-shaped biomass wafers with an average thickness of 0.07 inches and an average mass of 0.800 grams per wafer.

After baking the pre-net-shaped biomass wafers in the mold plate system, the wafers were then set on an Inconel tray to be placed into the furnace for high temperature charring between 750° C. to 850° C. under inert gas ($N_2$) for a 60 minute temperature ramp time of the furnace and additional 60 minutes charring at the peak target hold temperature, to convert them into the final net-shape monolithic biochar electrodes for the ultracapacitor, battery, fuel cell and other absorbent applications. When placed into the charring furnace, the wafers were held between ceramic plates to avoid distorting, saddling, or cupping, which can be cause by uneven heating by the furnace, or uneven moisture profile from poor biomass blend mixing with the activator and progenitor liquids in prior steps, the flat compressed biomass material thus resulting in flat cylindrical biochar products, similar in shape to a coin. Additionally, a layer of Inconel screen mesh was inserted between the biomass pre-net-shaped wafers and the ceramic plates on the top and bottom of the wafers before insertion into the furnace for charring to allow for off-gassing of the biomass charring pyrolysis by-products during and after this basic charring step. This is embodied so that the biomass vapors of tars, and other organics did not collect at the biomass/biochar surface interface to the tray or top-weight, and preventing these off-gases from frying and hardening on the electrode surface rendering it closed. The charring biomass wafers need to breathe while charring. This screen mesh layer in the charring process assembly also facilitates gas access into the charred biomass wafer electrodes for any additional subsequent activation by use of additive atmosphere gas (example: the disclosed $CO_2$ or steam) for additional activation during or after the basic charring step. (This subsequent gas activation step for this experiment was not performed in this experimental example, but is stated here in support of where it could occur in the method and how it could be applied, and is exemplified in subsequent examples.)

After charring in the furnace was complete, cooldown began by compressed forced air stream around the furnace exterior, blown between the furnace exterior insulated heaters and the furnace metal wall exterior. After complete cool down and extraction from the charring furnace, the electrodes were sonicated in distilled water and electrolyte solution to remove any loose particles and impurities prior to electrochemical capacitive testing. A battery tester (Vencon Model UBA5) was used to measure the capacitance of the electrode pairs. The ultracapacitor cell was assembled using the two electrodes and with a separator (CelGard 3401) all sandwiched between titanium charge collectors of titanium foil 0.02" thickness, and using 6.0 M KOH(aq) as electrolyte. The measured specific capacitance was measured at 150 Farads/gram for a 1.0 Volt operating window.

Experiment 2: Brewery Spent Grain Used as the Biomass Source

Experiment #2 utilized brewery spent grain biomass in place of the fine biomass at the same mass ratio with the medium biomass used in Experiment #1 (above), to explore the possibility and its performance as a successful ingredient for net-shaped electrodes. Malting barley (2-row was used but the application is not specifically limited to 2-row malted barley) was obtained from a local home brewing supply shop to be used for this experiment. The experimental team of the inventors performed the actual selection, weighing and grinding of the dry grain and also performed the brewing steps, to generate the spent grain biomass source. The 2-row malted barley was ground using a hand grinder typical used in a home-brewery situation, hence supporting the statements above disclosing that any method can be used for biomass grinding so long as the necessary particle size and fluffing can be achieved by such means. The ground grain material was washed in clean boiling filtered and demineralized tap water three times to extract the sugar from the barley replicating the brewing process. The resulting 2-row barley was labeled as "spent grain (2-row)". The spent grain was then dried in a vacuum oven at a temperature of no more than 60° C. to prevent caramelization or forbearance of the residual sugar. The dried spent grain was then ground using a Laboratory Retch model ZM-200 grinder at 18,000 RPM using the 24-tooth rotor and the 80 μm screen sieve mesh, to achieve the same biomass particle size as the "fine #5 blend" biomass. The remaining procedures for fabricating a spent grain wafer and electrode are similar to that listed in Experiment 1 with the exception that fine biomass was replaced with fine spent grain of two-row barley.

The single pair of resulting biochar electrodes were assembled as per Experiment #1 above and resulted in a measured specific capacitance of 120 Farads/gram at a 1.0 Volt operating window.

Experiment 3: Use of Different Biomass Source Blends

Similar to Experiment 2, other biomass materials such as Tiger Grass, *Phragmites Australis* and bamboo were explored for the same reasons of diversity of source or plant species. Each such biomass material above was dried in a 60° C. vacuum oven to remove the water content and then ground to specified particle size particular to its purpose of self-binding (fine) or scaffolding and bulk contribution (medium).

It was shown that the bamboo behaved very differently depending on which part (stem, leaf-stem, or leaves) was used. The stem of the bamboo, after grinding, exhibited highly fibrous integrity and served well as the reinforcing bar scaffolding for the electrode whereas the high silica content in the bamboo leaf prevented it from being further explored as a potential candidate via the utilized embodiment. The same process for blending and charring as Experiments #1 and #2 above were used for processing these other plant species.

The ultracapacitor cell was assembled using two electrodes made from bamboo stalk with a separator (CelGard 3401) sandwiched between titanium foil, 0.02" thick, and 6.0 M KOH(aq) used as electrolyte. The measured specific capacitance was measured at 82 Farads/gram for a 1.0 Volt operating window.

The ultracapacitor cell was assembled using two electrodes made from Tiger Gras with a separator (CelGard 3401) and sandwiched between titanium foil, 0.02" thick, and 6.0 M KOH(aq) used as electrolyte. The measured specific capacitance was measured at 67 Farads/gram for a 1.0 Volt operating window.

The electrodes made with bamboo leaf and bamboo leaf stem were unusable due to their frailty and lack of self-binding after charring in the furnace.

Experiment 4: Results of Post-Charring Activation with $CO_2$ Versus without $CO_2$ In Experiment #4, similar to Experiment #1, the nitrogen gas stream into the furnace during high temperature charring was replaced by a stream of carbon dioxide (0.3 ft$^3$/hour). This purge gas substitution was only done during the high temperature charring phase to evaluate effect of gas activation after completion of the basic 60-minute high temperature charring step. This was believed to be favorable for additional activation of the net-shaped carbonaceous electrodes. It was known that the introduction of $CO_2$ in the presence of carbonaceous material will react with the carbonaceous material via the reverse Boudouard reaction to form CO (carbon monoxide) thereby "etching" the carbonaceous structure of the monolithic biochar electrode surface and interior, and creating more pores and channels. Upon high temperature $CO_2$ charring treatment, the resulting wafers exhibited favorable higher capacitance. It was observed that the surface of the $CO_2$-activated monolithic electrodes was rougher than those without $CO_2$ activation. This is a result of the invasive and etching effect of the $CO_2$ as the gas discriminates between reactive and non-reactive sites based on the morphology of the biochar for CO conversion.

The ultracapacitor cell was assembled using two electrodes made from 50% medium grind biomass and 50% fine 80 µm grind biomass but wetted with Formic Acid when preparing the pre-net-shaped biomass wafers for low temperature baking. These formic Acid treated wafers were charred in the high temperature furnace with the substitutive $CO_2$-activation purge gas, and assembled with a separator (CelGard 3401), titanium foil 0.02" thick, and 6.0 M KOH (aq) used as electrolyte. The measured specific capacitance was measured at 208 Farads/gram for a 1.0 Volt operating window.

A second batch charred in the furnace with all other conditions being equal but no addition of post-charring $CO_2$ allowed for the ultracapacitor cells to be similarly assembled using two electrodes made from 50% medium grind biomass and 50% fine 80 µm grind biomass but wetted with formic acid, charred as above and assembled with a separator (CelGard 3401), titanium 0.02" thick, and 6.0 M KOH(aq) used as electrolyte. The measured specific capacitance was measured at 92 Farads/gram for a 1.0 Volt operating window.

Experiment 5: Use of the Fabricated Biochar Electrodes in a Fuel-Cell

Experiment #5 utilized a pair of free-standing monolithic biochar electrodes to fabricate a basic cold fuel-cell. To demonstrate that the embodiment of these end-product electrodes produced by the disclosed method can generate direct current (DC) electricity, a simple biological fuel-cell was assembled. Common garden soil (topsoil) was placed in a clear 1 pint glass container. The biochar electrodes fabricated by the same disclosed method of Experiment #1 above, were each attached to individual wire leads and inserted into the garden soil with the wire leads extending out and not in contact with the soil. A common gel separator (agar or equal) was poured between the electrodes to separate the soil into two "chambers". The separator gel was insulative to electric current but microporous to allow the diffusion of gas and ions. After several hours to allow for microbial activation to generate methane, hydrogen and oxygen, a 0.5 volts potential was observed across the two wire leads extending out of the two submerged subject electrodes. Although simple in form, the Experiment #5 fully supports the claim that the electrodes produced by the disclosed method function in a fuel-cell. Note well that the disclosed method for complete fabrication of these monolithic biochar electrodes utilize a high temperature furnace and the resultant electrodes can withstand such high temperatures while in service as electrodes for typical high-temperature PEM fuel-cells and other embodiments of fuel-cells beyond the simple Experiment #5 described herein.

Experiment #6: Use of the Biochar Electrodes in a Water-Electrolysis Based Gas Generator to Produce Hydrogen Gas and/or to Produce Oxygen Gas Experiment #6 demonstrates that the disclosed Net-Shaped Biochar Monolithic Electrodes can be used in a water-electrolysis gas generator. In this particular experiment, the electrolysis medium was distilled water that included adequate potassium hydroxide as a solute to a concentration of approximately 6 Molar (about 30% by weight KOH in distilled water). This electrolyte addition thereby commonly follows the method known as "Alkaline Electrolysis". The disclosed monolithic highly porous biochar electrodes, fabricated in accordance with the methods disclosed herein and more specifically in accordance with the formula utilized in Experiment #1 above, were each fastened along an edge to conducting clips and wires and then submerged into the aqueous 6 Molar KOH electrolyte. Care was taken to ensure only the electrode monolith body was submerged in and touched the electrolyte solution and that the attached electrically conductive wires, clips or fasteners did not touch the electrolyte solution liquid. The positive power supply terminal was connected to one wire lead from one monolithic electrode and the negative terminal of the power supply was connected to the other wire lead of the other monolithic electrode. The polarities of the power supply leads were indiscriminately assigned to either of the monolith biochar electrodes since both electrodes were of the same formulation and fabrication method. Once the electrodes were submerged into the electrolyte and all wire and fastener connections were complete, the power supply was turned on, providing electric voltage across the electrode pair. A voltage of greater than 1.23 Volts, and furthermore greater than 1.7 Volts, specifically 5 Volts was applied to the electrodes via the wire leads connected to a DC power supply set to the 5 Volt potential. Following a brief time of about 15 seconds for the aqueous 6 Molar KOH electrolyte to soak into the highly porous monolithic biochar electrodes, the electrodes both began to produce large quantities of gas bubbles at the wetted submerged face of the monolithic electrodes. Once gas production began, the electric current was observed at 0.75 amps across a total cross-section area of each wetted portion of the electrode of 0.625 sq.in. or 1.2 amps per sq. in. Samples of the gas confirmed hydrogen gas being produced at the negative polarity electrode and oxygen gas being produced at the positive terminal.

Counter-Experiment Examples: Below are two Counter-Experiment Examples, wherein particular details of the disclosed methods were intentionally not adhered to, and the end results were either poor or there was a total failure of the embodiment electrode.

Counter-Experiment 1: Non-Blended Two-Row Hops Resulting in Weak and Fragile Electrodes Experiment #1 was repeated as a counter-experiment using only 2-row as the fine grind made by using the 80 μm screen in the Retsch ZM-200 at 18,000 RPM, 24-tooth rotor and 80 μm sieve screen. The 2-row barley didn't perform as well in the press or after charring. The surfaces of the wafers were very rough, therefore unideal to be used as electrodes, causing piercing of the separator and having uneven contact with the metal foils charge collectors, mechanical weakness, and excessive expulsion of charring byproducts during sonication.

Counter-Experiment 2: Excessive $CO_2$ Gas Activation Flow, Wafer Crumbles, Loss of Fine Biomass Self-Binding Effect In an experiment similar to Experiment 4, a higher $CO_2$ gas flow rate (0.5 ft$^3$/hour) was used. After charring, it was observed that the original net-shaped carbon wafers expected to be found in the furnace had actually been reduced to carbon dust and small agglomerates of carbon powder. This is highly probable due to over-gasification resulting structural destruction of the carbonaceous material. Therefore, the ratio of $CO_2$ to mass of carbonaceous materials should be carefully selected to prevent over-gasification which causes most or all the carbonaceous material to convert to CO (carbon monoxide) ultimately reducing the net-shaped wafer into unusable powder.

Although the systems and methods of the present invention have been described with reference to various exemplary embodiments and implementations, it is to be understood by persons skilled in the art that the present invention by or to such exemplary embodiments/implementations. Rather, the disclosed systems/methods may be varied, modified, refined and/or enhanced without departing from the spirit or scope of the present disclosure.

The invention claimed is:

1. A method for producing an electrode, comprising:
   a. blending biomass of different grind sizes to form a biomass blend, wherein the biomass includes coarse grind particles, medium grind particles and fine grind particles, and wherein the coarse grind particles comprise particles dimensioned beween 1 mm to 5 mm, the medium grind particles comprise particles dimensioned between 0.1 mm and 2 mm, and the fine grind particles comprise particles less than 25 μm in any dimension;
   b. combining the biomass blend with self-binding progenitor compounds that comprise a protic acid or a basic salt and that function to attack chemical bonds associated with the biomass material,
   c. casting or molding the biomass blend in the presence of the self-binding progenitor compounds to form a biomass wafer or pellet with a predefined shape, and
   d. charring the biomass wafer or pellet in a furnace to form a biochar electrode that reforms or rebinds to itself during the charring based on the presence of the self-binding progenitor compounds to define a net-shaped geometry.

2. The method according to claim 1, wherein the protic acid is selected from the group consisting of formic acid, performic acid, acetic acid, peracetic acid, boric acid, or nitric acid or any blends thereof, or hydrogen peroxide.

3. The method according to claim 1, wherein the basic salt is selected from the group consisting of potassium hydroxide, sodium hydroxide and another metal salt or any blends thereof.

4. The method according to claim 1, wherein loading of the self-binding progenitor compounds is between 5 to 91 wt % with respect to biomass blend.

5. The method according to claim 1, further comprising providing a press plate system for casting or molding the biomass blend and a mold release compound that coats the press plate system to avoid the biomass wafer or pellet from sticking to the press plate system.

6. The method according to claim 5, wherein the mold release compound is selected from the group consisting of olive oil, canola oil, corn oil, generic vegetable oil, nut oil, seed oil or any plant fat or any animal fat, and wherein the mold release compound is applied by wetting and spreading or by spray application.

7. The method according to claim 1, wherein flat or predetermined curved or shapedholders of ceramic or metal are used to hold and press the biomass wafer or pellet during charring.

8. The method according to claim 1, wherein an activation gas is introduced into the charring furnace during or after charring, or in a separate furnace to further activate the biochar electrode.

9. The method according to claim 1, further comprising sonicating the biochar electrode in a liquid solvent to remove loose particles.

10. The method according to claim 9,
    wherein the liquid solvent is distilled water, deionized water or an aqueous electrolyte solution, or any soluble or rinseable detergent, cleaning agent, organic solvent or cleanser, and wherein the concentration of the aqueous electrolyte solution enables the biochar electrode to hold electrical charge based on the porosity and internal surface area of the biochar electrode.

11. The method according to claim 9, wherein the sonicated biochar electrode is rinsed with deionized water, or distilled water, or an electrolyte solution or a volatile organic solvent, and dried for use in aqueous or non-aqueous electrical applications or absorbent applications.

12. The method according to claim 11, wherein the electrical applications include super-capacitor electrodes, pseudo-capacitors, batteries and fuel-cells.

13. The method according to claim 11, wherein each sonicated electrode is paired with at least one non-aqueous ionic salt compound in at least one organic solvent or ionic liquid.

14. The method according to claim 9, wherein the wet sonicated biochar electrode is rinsed and dried for use in a non-aqueous electrical application, and wherein the non-aqueous electrical application is selected from the group consisting of super-capacitor electrodes, pseudo-capacitors, batteries or fuel-cells, each being paired with non-aqueous ionic liquids.

15. The method according claim 9, wherein the wet sonicated biochar electrode is rinsed and dried for use in non-liquid-based electrical applications that include super-capacitor electrodes, pseudo-capacitors and batteries, and wherein the aqueous electrolyte solution is a solvated solid electrolyte inserted in the electrode channels and pores by soaking or vacuum impregnation and re-pressurization while being submerged in the solvated solid- electrolyte transport solution, then dried, and repeated to a desired electrode channel and pore capacity utilization of solid electrolyte loading.

16. The method according to claim 1, further comprising using the biochar electrode in an assembly that forms an ultra-capacitor, pseudo-capacitor, battery, fuel cell or other adsorbent application.

* * * * *